United States Patent
Fujiwara

(10) Patent No.: US 12,405,756 B2
(45) Date of Patent: Sep. 2, 2025

(54) PRINTING APPARATUS CAPABLE OF IMPROVING CONVENIENCE OF SETTING SHEET SETTINGS, METHOD OF CONTROLLING PRINTING APPARATUS, AND STORAGE MEDIUM

(71) Applicant: CANON KABUSHIKI KAISHA, Tokyo (JP)

(72) Inventor: Izumi Fujiwara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/229,768

(22) Filed: Aug. 3, 2023

(65) Prior Publication Data

US 2024/0053939 A1 Feb. 15, 2024

(30) Foreign Application Priority Data

Aug. 9, 2022 (JP) .................................. 2022-127255

(51) Int. Cl.
*G06F 15/00* (2006.01)
*G06F 3/12* (2006.01)

(52) U.S. Cl.
CPC ............ *G06F 3/1255* (2013.01); *G06F 3/121* (2013.01); *G06F 3/125* (2013.01)

(58) Field of Classification Search
None
See application file for complete search history.

(56) References Cited

U.S. PATENT DOCUMENTS

| 6,718,490 B1* | 4/2004 | Takemoto | G03G 15/5079 715/707 |
| 2005/0012940 A1* | 1/2005 | Matsuda | H04N 1/333 358/1.15 |
| 2011/0161746 A1* | 6/2011 | Ooya | G06F 11/0793 714/57 |
| 2018/0364961 A1* | 12/2018 | Futatsumori | H04N 1/0048 |

FOREIGN PATENT DOCUMENTS

JP 2019-004393 A 1/2019

* cited by examiner

*Primary Examiner* — Mark R Milia
(74) *Attorney, Agent, or Firm* — VENABLE LLP

(57) ABSTRACT

A printing apparatus executes a first notification using a first notification screen that, due to a difference of sheet information set in a received print job from the sheet information associated with the sheet setting applied to the printing apparatus when the print job has been received, prompts the user to change sheet information, and executes a second notification using a second notification screen, different from the first notification screen, that prompts, due to the difference, the user to confirm the sheet setting applied to the printing apparatus.

26 Claims, 20 Drawing Sheets

FIG. 4A

SHEET INFORMATION-SETTING SCREEN

For "BODY PANEL SPECIFICATION: *", you can register a sheet size and a sheet type.

BODY PANEL SPECIFICATION: A4 — 601

| SHEET SIZE | A4 |
| --- | --- |
| SHEET TYPE | PLAIN PAPER |

BODY PANEL SPECIFICATION: LTR — 602

| SHEET SIZE | LTR |
| --- | --- |
| SHEET TYPE | PLAIN PAPER |

BODY PANEL SPECIFICATION: 4 × 6 — 603

| SHEET SIZE | 4 × 6 |
| --- | --- |
| SHEET TYPE | GLOSSY PAPER |

BODY PANEL SPECIFICATION: * — 604

| SHEET SIZE | B5 ▼ | — 605 |
| --- | --- | --- |
| SHEET TYPE | PLAIN PAPER ▼ | — 606 |

[ OK ]  [ CANCEL ]
 610      611

600

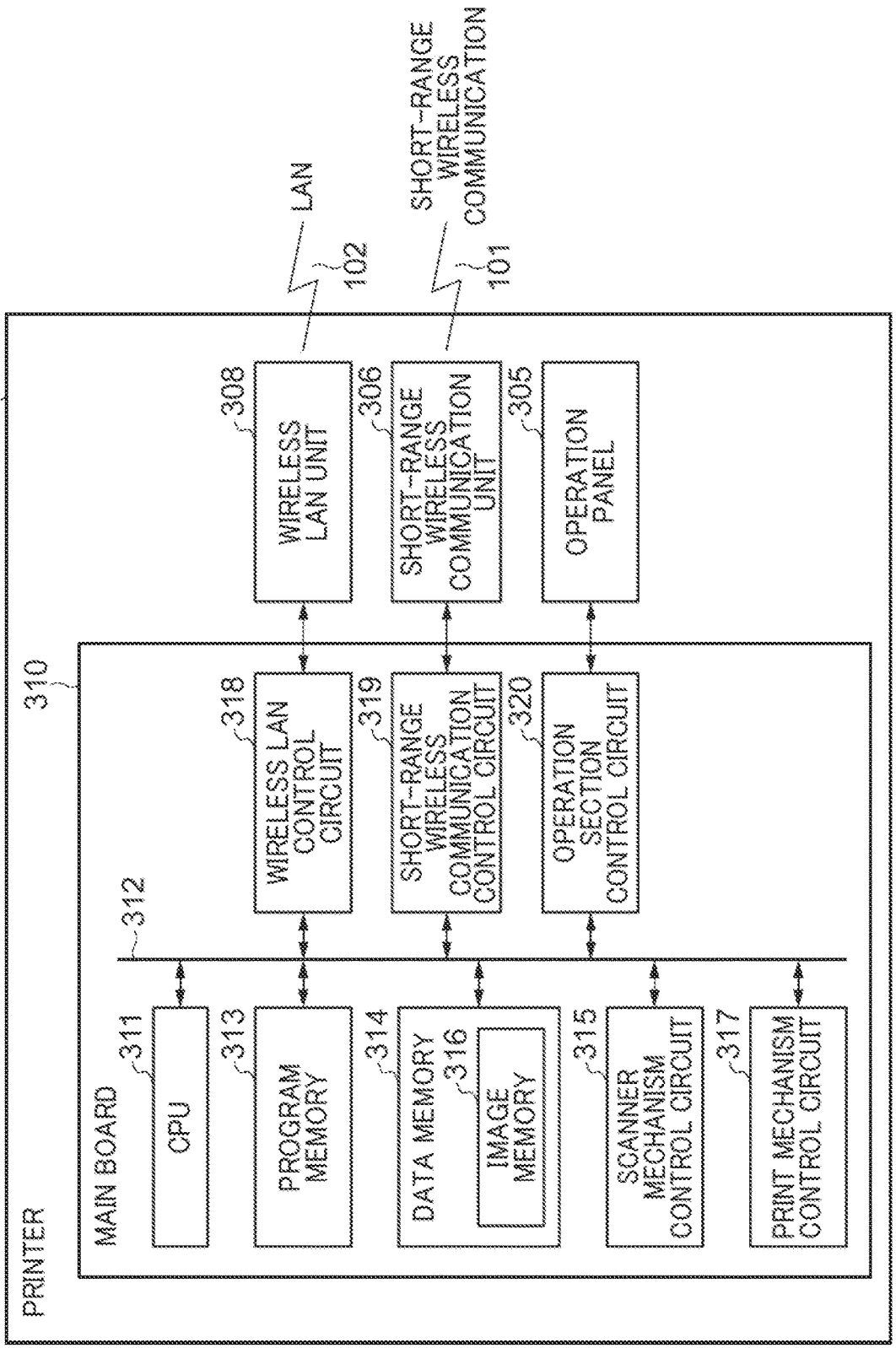

FIG. 9

| | | | |
|---|---|---|---|
| 5001 — | SHEET SETTING SELECTION  1 ~ 4 | | |
| 5002 — | BODY PANEL SPECIFIFICATION: A4 | | |
| | SHEET SIZE | 1: SHEET SIZE ID | — 5006 |
| | SHEET TYPE | 1: SHEET TYPE ID | — 5007 |
| 5003 — | BODY PANEL SPECIFIFICATION: LTR | | |
| | SHEET SIZE | 10: SHEET SIZE ID | — 5008 |
| | SHEET TYPE | 1: SHEET TYPE ID | — 5009 |
| 5004 — | BODY PANEL SPECIFIFICATION: 4 × 6 | | |
| | SHEET SIZE | 8: SHEET SIZE ID | — 5010 |
| | SHEET TYPE | 2: SHEET TYPE ID | — 5011 |
| 5005 — | SPECIFIFICATION: ∗ | | |
| | SHEET SIZE | 0: NOT SET, 1 ~ 14: SHEET SIZE ID | — 5012 |
| | SHEET TYPE | 0: NOT SET, 1 ~ 5: SHEET TYPE ID | — 5013 |

5000

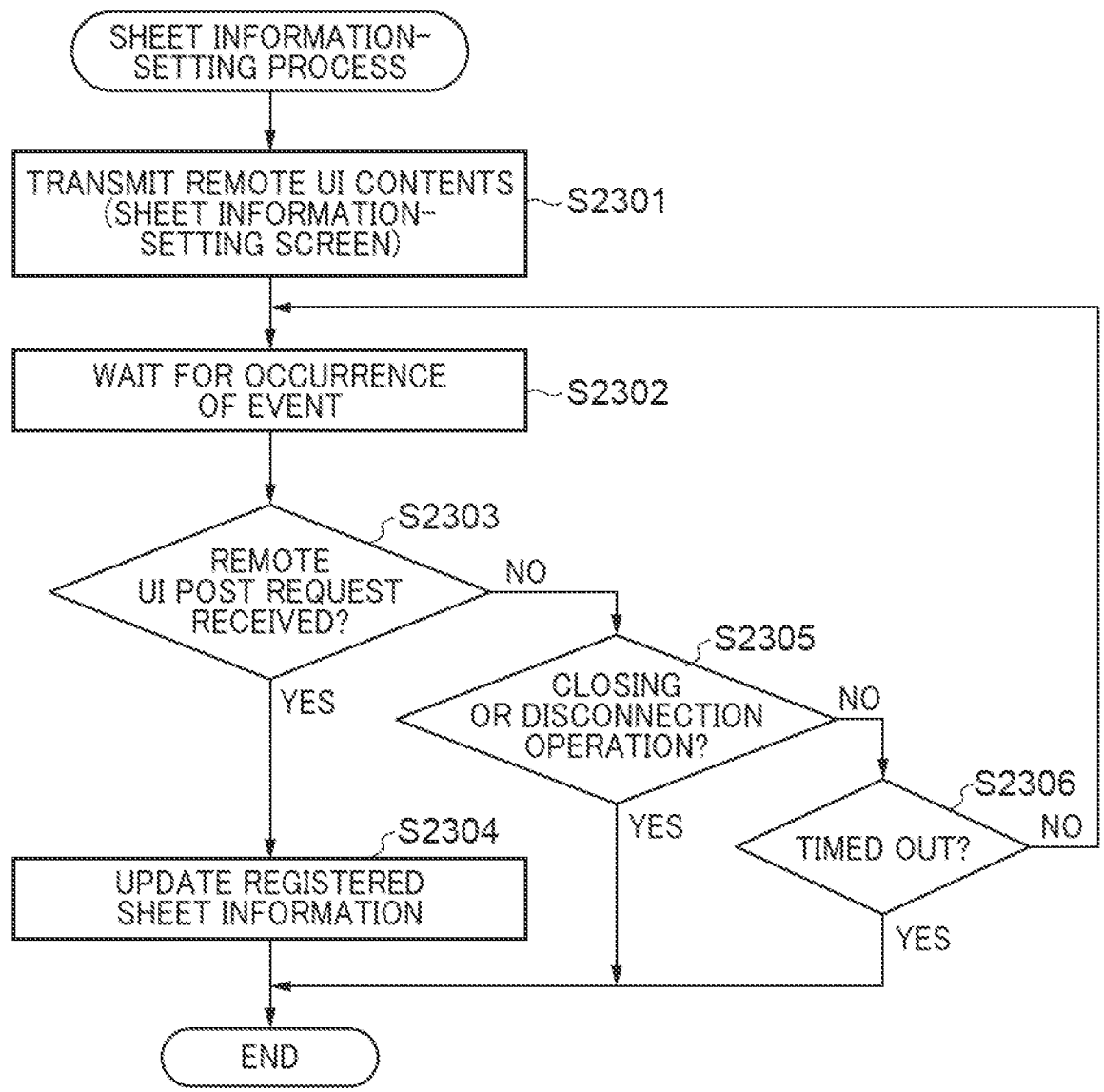

FIG. 14

| COMMAND NAME | NUMBER | DATA LENGTH | DATA |
|---|---|---|---|
| JOB START | 00 | 1 | JOB TYPE (1: PRINT, 2: SCAN, 3: SETTING, 4: MAINTENANCE) |
| JOB END | 01 | 0 | NO DATA |
| JOB CANCEL | 02 | 0 | NO DATA |
| PRINT PARAMETER SETTING | 10 | 3 | SHEET SIZE ID, SHEET TYPE ID, PRINT QUALITY SPECIFICATION |
| PAGE START | 11 | 1 | PAGE NUMBER |
| PRINT DATA TRANSFER | 12 | VARIABLE | PRINT DATA (BIT IMAGE) |
| PAGE END | 13 | 0 | NO DATA |
| SCAN PARAMETER SETTING | 20 | 2 | ORIGINAL SIZE ID, SCAN IMAGE QUALITY SPECIFICATION |
| SCAN EXECUTION START | 21 | VARIABLE | DATA STORAGE DESTINATION SPECIFICATION |
| SCAN STOP | 22 | 0 | NO DATA |
| REGISTERED SHEET SETTING | 30 | 2 | SHEET SIZE ID, SHEET TYPE ID |
| SETTING RESET | 31 | 0 | NO DATA |
| ERROR RELEASE | 40 | 0 | NO DATA |
| HEAD CLEANING EXECUTION | 41 | 2 | HEAD TYPE, CLEANING TYPE |
| INK REPLACEMENT EXECUTION | 43 | 1 | INK TYPE |
| PRINTER POWER-OFF | 44 | 0 | NO DATA |

FIG. 19A

CANON G2070 SERIES (4 COPIES) – USB055

Support number: 2114

The sheet settings of the print data are different from the sheet settings registered for the rear tray.
Confirm the display of the printer.

[INSTRUCTION MANUAL] ～ 19A1

19A2 ～ [STOP PRINTING]

FIG. 19B

CANON G2070 SERIES (4 COPIES) – USB055

Support number: 2116: 2116

The sheet size of the print data is not a sheet size which can be set for the printer.
Press the stop button of the printer to stop printing and perform printing again after changing the settings.
You can change the settings from the remote UI. Refer to the instruction manual for details.

You can confirm the remote UI from "OPEN REMOTE UI" of IJ Printer Assistant Tool.

[INSTRUCTION MANUAL] ～ 19B1

19B2 ～ [STOP PRINTING]

PRINTING APPARATUS CAPABLE OF IMPROVING CONVENIENCE OF SETTING SHEET SETTINGS, METHOD OF CONTROLLING PRINTING APPARATUS, AND STORAGE MEDIUM

BACKGROUND OF THE INVENTION

Field of the Invention

The present invention relates to a printing apparatus, a method of controlling the printing apparatus, and a storage medium, and more particularly to a printing apparatus that has a print function capable of performing printing with a plurality of sheet settings, and is capable of improving the convenience of setting sheet settings, a method of controlling the printing apparatus, and a storage medium.

Description of the Related Art

Conventionally, there is known a printing apparatus that is capable of using a variety of sizes and types of sheets as sheets used for printing. In a case where a printing apparatus of this type performs printing, such as copying, on a stand-alone basis, means is required which enables a user to select a sheet size and a type of sheet to be used (hereinafter such a combination of settings is referred to as "sheet settings"). Conventionally, for an inexpensive printing apparatus and a compact printing apparatus, there has been proposed, as such means, a simple display on which sheet settings can be selected. For example, Japanese Laid-Open Patent Publication (Kokai) No. 2019-4393 discloses a technique in which a user selects sheet settings using a main unit's user interface (UI) including a simple display that displays sheet settings by illuminating frames having respective predetermined shapes for number and character information with LED lights, and hard keys including a sheet selection button and a finalize button. In this technique, sheet sizes of predetermined types are sequentially switched and displayed on the display each time the sheet selection button is pressed, and when the finalize button is pressed, one of the sheet sizes displayed on the display is finally determined as the size of sheets to be used when executing printing.

Incidentally, as a method of setting sheet settings of the printing apparatus by operations performed on the printing apparatus comes into widespread use, there is an increasing demand for the improvement of the convenience of the printing apparatus using the method.

SUMMARY OF THE INVENTION

The present invention provides a printing apparatus that is capable of improving the convenience of the printing apparatus using a method of setting sheet settings of the printing apparatus by operations performed on the printing apparatus, a method of controlling the printing apparatus, and a storage medium.

In a first aspect of the present invention, there is provided a printing apparatus to which is applied a sheet setting selected by a user out of a plurality of sheet settings including a first sheet setting and a second sheet setting, wherein the first sheet setting is a setting with which is associated sheet information on a first sheet determined in advance without user's selection, wherein the second sheet setting is a setting with which is associated sheet information on a second sheet selected by the user out of the plurality of sheets, the printing apparatus including a reception unit configured to receive a print job, a print unit configured to execute printing based on the print job, and an execution unit configured to execute a first process before the printing based on the received print job is executed, based on occurrence of a first error that sheet information set in the received print job is different from sheet information associated with a sheet setting applied, out of the plurality of sheet settings, to the printing apparatus when the print job has been received, and also the sheet information set in the received print job is not the first sheet information, and execute a second process different from the first process before the printing based on the received print job is executed, based on occurrence of a second error that the sheet information set in the received print job is different from the sheet information associated with the sheet setting applied, out of the plurality of sheet settings, to the printing apparatus when the print job has been received, but the sheet information set in the received print job is the first sheet information.

In a second aspect of the present invention, there is provided a method of controlling a printing apparatus to which is applied a sheet setting selected by a user out of a plurality of sheet settings including a first sheet setting and a second sheet setting, wherein the first sheet setting is a setting with which is associated sheet information on a first sheet determined in advance without user's selection, wherein the second sheet setting is a setting with which is associated sheet information on a second sheet selected by the user out of the plurality of sheets, the method including receiving a print job, executing printing based on the print job, executing a first process before the printing based on the received print job is executed, based on occurrence of a first error that sheet information set in the received print job is different from sheet information associated with a sheet setting applied, out of the plurality of sheet settings, to the printing apparatus when the print job has been received, and also the sheet information set in the received print job is not the first sheet information, and executing a second process different from the first process before the printing based on the received print job is executed, based on occurrence of a second error that the sheet information set in the received print job is different from the sheet information associated with the sheet setting applied, out of the plurality of sheet settings, to the printing apparatus when the print job has been received, but the sheet information set in the received print job is the first sheet information.

According to the present invention, it is possible to improve the convenience of the printing apparatus using the method of setting sheet settings of the printing apparatus by operations performed on the printing apparatus.

Further features of the present invention will become apparent from the following description of exemplary embodiments (with reference to the attached drawings).

BRIEF DESCRIPTION OF THE DRAWINGS

FIGS. 4A to 4C are diagrams each showing a sheet information-setting screen of a remote user interface (UI).

FIG. 5 is a block diagram showing a hardware configuration of the printer.

FIG. 9 is a diagram showing a data structure of sheet information settings of the printer.

FIG. 13 is a flowchart of a sheet information-setting process in a step in FIG. 10.

FIG. 14 is a diagram showing a command list used in a driver job generated by a custom print driver of the smartphone.

FIGS. 19A and 19B are diagrams each showing an example of a screen displayed on the smartphone.

DESCRIPTION OF THE EMBODIMENTS

The present invention will now be described in detail below with reference to the accompanying drawings showing embodiments thereof. Note that the component elements described in the following embodiment are described only by way of example, and are by no means intended to limit the scope of the present invention to them alone.

Figure 1:
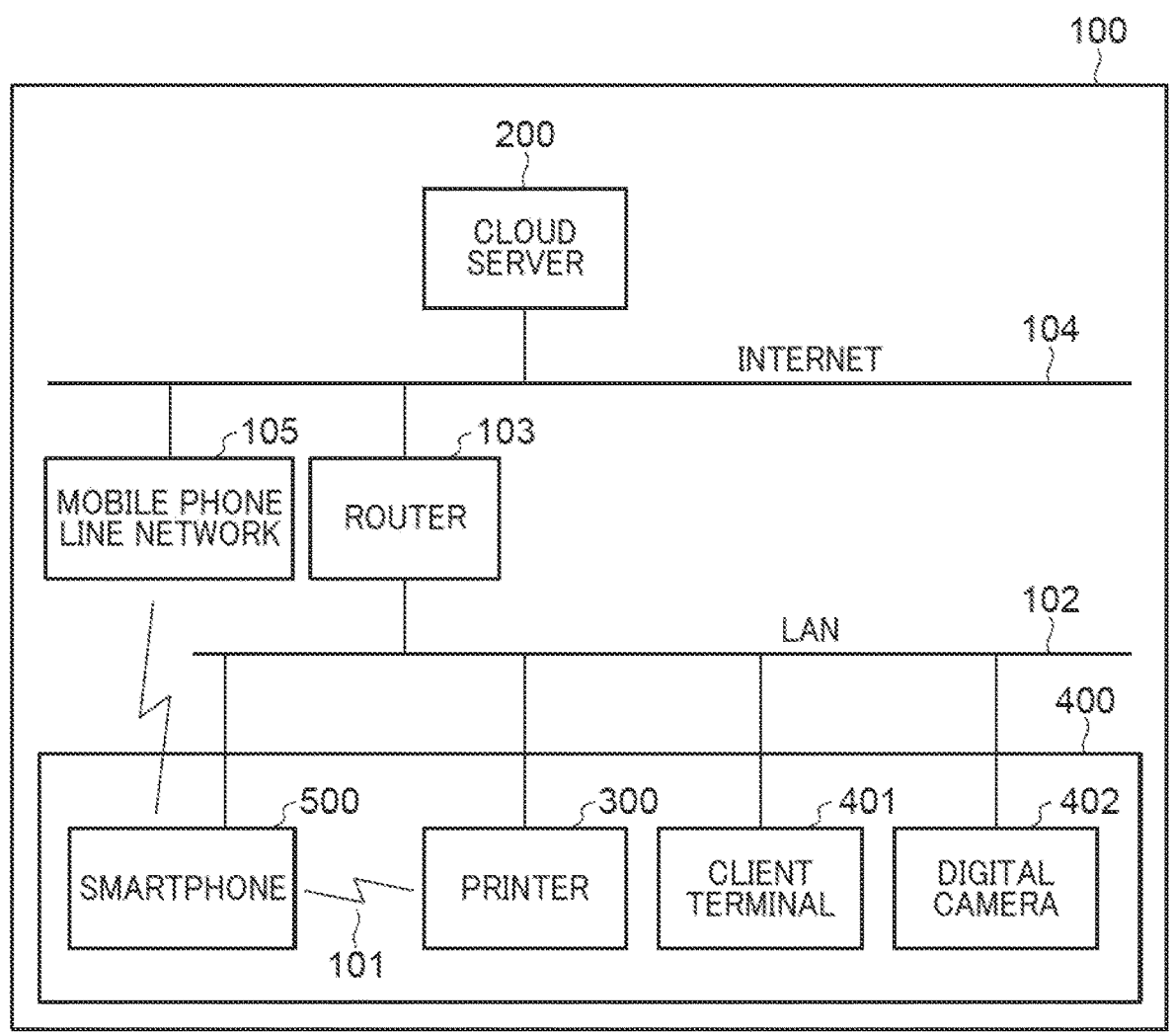
FIG. 1 is a diagram showing the whole configuration of a system including a printer as a printing apparatus according to a first embodiment of the present invention.

FIG. 1 is a diagram showing the whole configuration of a system 100 including a printer 300 as a printing apparatus according to a first embodiment of the present invention.

Referring to FIG. 1, the system 100 is comprised of a cloud server 200 and a device group 400, which are connected by a local area network (LAN) 102 and the Internet 104.

The device group 400 includes a variety of apparatuses connectable via a network. In the present embodiment, as shown in FIG. 1, a smartphone 500, the printer 300, a client terminal 401, such as a personal computer or a work station, and a digital camera 402 are included in the device group 400, by way of example. However, types of the apparatuses included in the device group 400 are not limited to these but may include electrical home appliances, such as a refrigerator, a television, and an air conditioner.

The apparatuses included in the device group 400 are interconnected via the LAN 102 and can be connected to the Internet 104 via a router 103 connected to the LAN 102. Here, although the router 103 is illustrated as a device connecting between the LAN 102 and the Internet 104, the router 103 can be equipped with a function of a wireless LAN access point (not shown) as a component of the LAN 102. In this case, the device group 400 can not only connect to the router 103 by a wired LAN, but also connect to the access point by a wireless LAN to thereby participate in the LAN 102. For example, it is possible to connect the printer 300 and the client terminal 401 to the router 103 by the wired LAN, and connect the smartphone 500 and the digital camera 402 to the router 103 (access point) by the wireless LAN. The device group 400 and the cloud server 200 can communicate with each other via the Internet 104 connected via the router 103. Further, the variety of apparatuses included in the device group 400 can communicate with one another via the LAN 102.

Further, the smartphone 500 and the printer 300 can communicate with each other via short-range wireless communication 101. The method of the short-range wireless communication 101 is not particularly limited, but for example, a method using wireless communication conforming to the Bluetooth (registered trademark) standard or the near field communication (NFC) standard can be employed.

Further, the smartphone 500 is also connected to a mobile phone network 105 connected to the Internet 104 and can also communicate with the cloud server 200 via the mobile phone network 105.

Note that the configuration of the system 100, shown in FIG. 1, shows an example of the present invention, and there would be no change in the advantageous effects provided by the present invention even when a system having a different configuration is employed. For example, although the router 103 is equipped with the access point function by way of example, the access point used by the device group 400 to participate in the LAN 102 using the wireless LAN may be formed by a device different from the router 103.

Figure 2A:
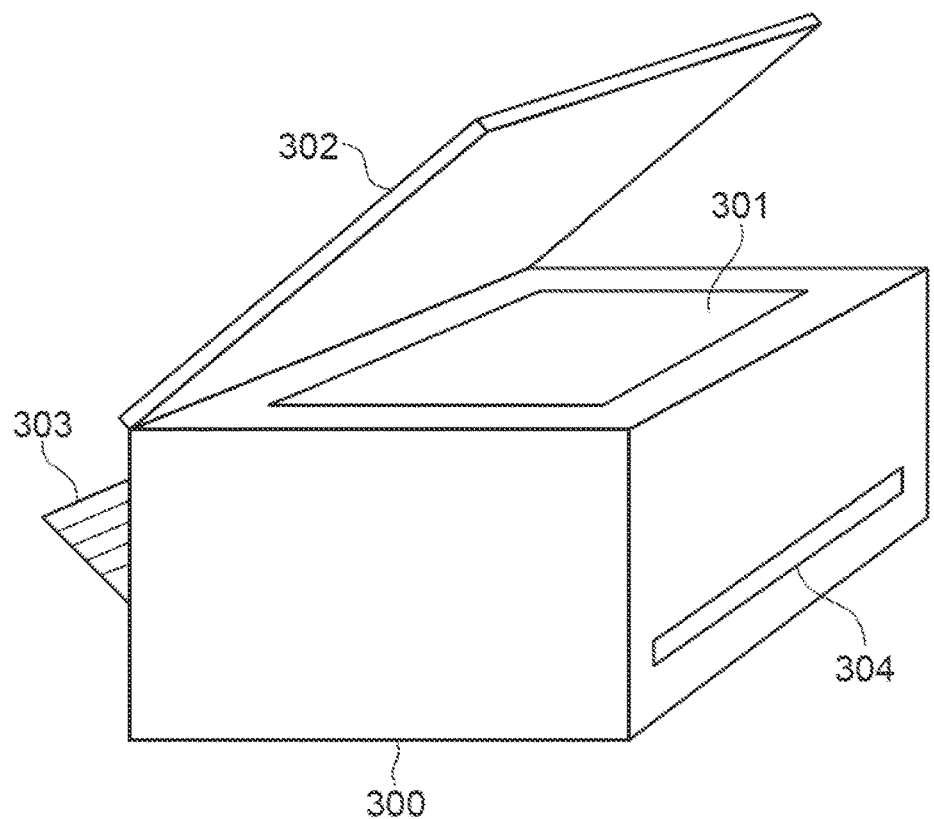
FIG. 2A is an appearance perspective view of the printer.
Figure 2B:
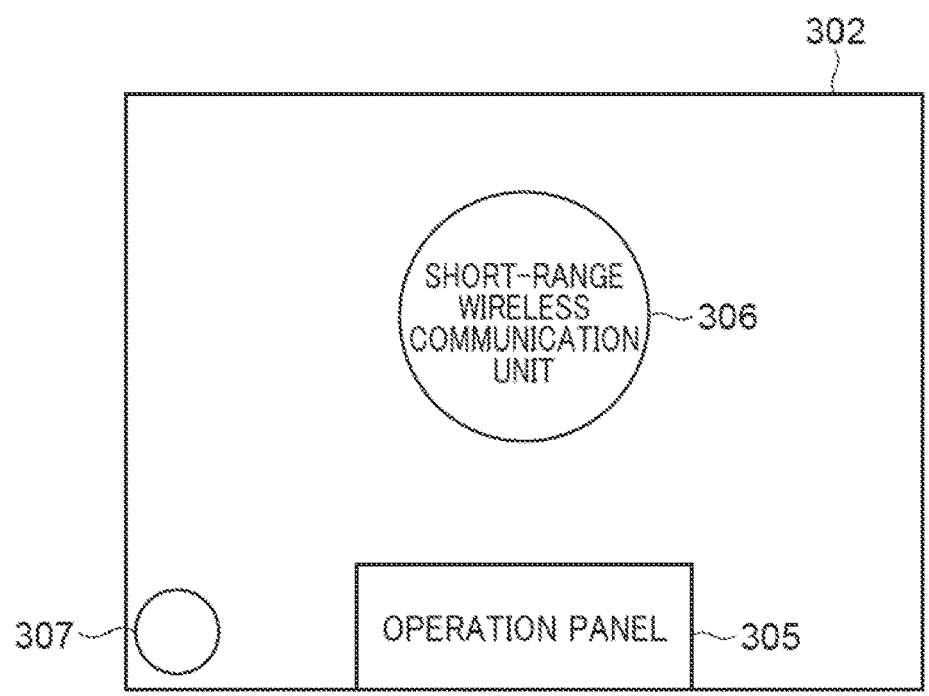
FIG. 2B is a schematic appearance view of a top surface of the printer.

FIGS. 2A and 2B are an appearance perspective view of the printer and a schematic appearance view of a top surface of the printer, respectively.

As shown in FIGS. 2A and 2B, the printer 300 is a multifunction printer (MFP) equipped with a scanner function and other functions. Note that the printer 300 shows an example of the printing apparatus according to the present invention, and the printing apparatus is not limited to this insofar as it is an apparatus equipped with an operation panel 305 (main unit's user interface (UI)), described hereinafter, a print function capable of performing printing with a plurality of sheet settings, and a communication function of communicating with external terminal apparatuses including the smartphone 500.

FIG. 2A is the appearance perspective view of the printer 300.

Referring to FIG. 2A, the printer 300 includes an original platen glass 301, an original platen glass pressing plate 302, a print sheet insertion inlet 303, and a printed sheet discharge outlet 304.

The original platen glass 301 is a transparent glass table and is used when an original image is read using a scanner mechanism after setting an original thereon. The original platen glass pressing plate 302 is a cover for pressing an original against the original platen glass 301 so as to prevent the original from floating when the original image is read by the scanner mechanism, and preventing outside light from entering the scanner mechanism of the printer 300.

The print sheet insertion inlet 303 is an insertion inlet for setting a variety of sizes of sheets. The sheets set on the print sheet insertion inlet 303 are conveyed into a print mechanism (not shown) arranged inside the printer 300 one by one, and discharged from the printed sheet discharge outlet 304 after being subjected to predetermined printing.

FIG. 2B is the schematic appearance view of the top surface of the printer 300.

Referring to FIG. 2B, on the top of the original platen glass pressing plate 302, there are arranged the operation panel 305, a short-range wireless communication unit 306, and a wireless LAN antenna 307.

The short-range wireless communication unit 306 is a unit for performing the short-range wireless communication 101 and is capable of communicating with a short-range wireless communication unit of a communication partner (the smartphone 500 in the present embodiment) existing within a predetermined distance. The wireless LAN antenna 307 has an antenna embedded therein, for connecting to the access point described with reference to FIG. 1, using the wireless LAN so as to participate in the LAN 102.

Figure 3:
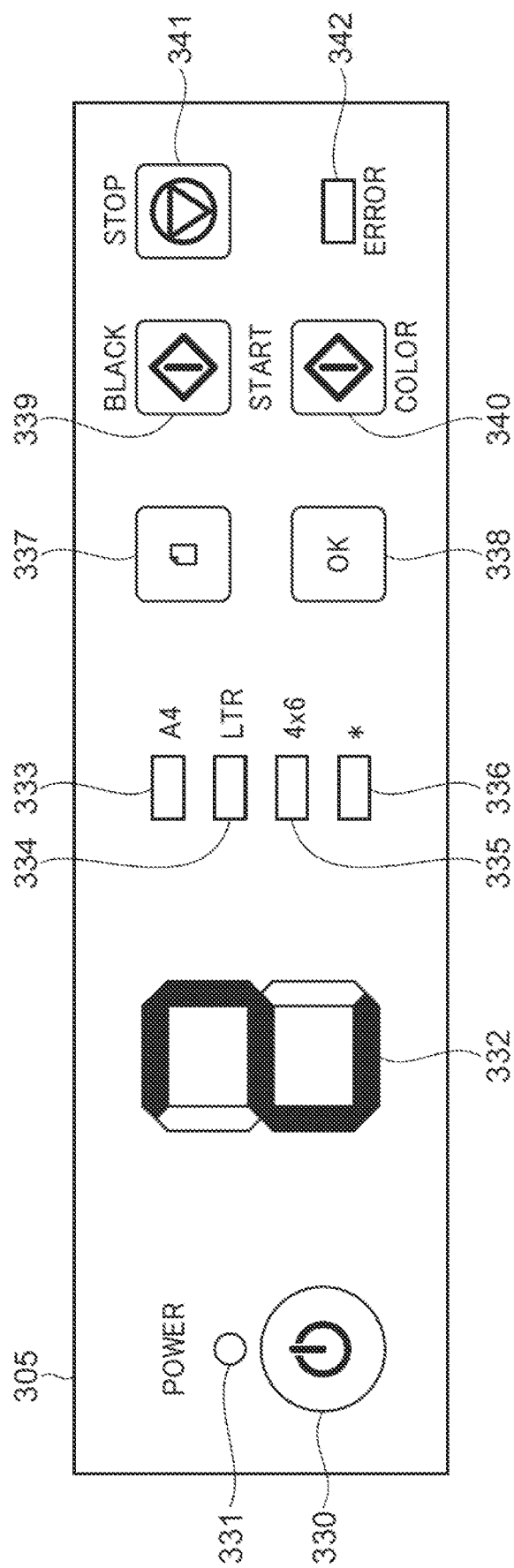
FIG. 3 is a view showing the configuration of an operation panel as a main unit's user interface of the printer.

FIG. 3 is a view showing the configuration of the operation panel 305 as the main unit's user interface of the printer 300.

Referring to FIG. 3, the operation panel 305 is formed by a variety of display lamps each using a light emitting diode (LED) and a variety of keys for receiving user's operations. However, the main unit's user interface of the printing apparatus according to the present invention is only required to be configured such that a user can select between a plurality of print settings, but the configuration of the main unit's user interface is not limited to that of the operation panel 305 in the present embodiment. For example, the main unit's user interface may be configured to have a liquid crystal screen or an organic electroluminescence (EL) screen, on which graphic display can be displayed, and a touch panel function.

The variety of keys of the operation panel 305 include a power key 330, a sheet selection key 337, an OK key 338, a monochrome start key 339, a color start key 340, and a stop key 341. Further, the variety of display lamps of the operation panel 305 include a power lamp 331, a number-of-copies display section 332, sheet selection lamps 333 to 336, and an error lamp 342.

The power key 330 is a key for performing power-on and power-off operations. When the power key 330 is pressed by a user in a power-off state, the printer 300 is shifted to a power-on state. Inversely, when the power key 330 is pressed by a user in the power-on state, the printer 300 is shifted to the power-off state. Further, when the power key 330 is pressed by a user during printing operation or other processing operations, the printer 300 is shifted to the power-off state after completing or stopping the processing operation being performed.

The power lamp 331 is a lamp indicating a power state of the printer 300. The power lamp 331 is on (lights) in the power-on state and is off (extinguishes) in the power-off state. The power lamp 331 may be configured to blink e.g. during printing operation or like other processing operations, during shift to the power-on state, and during shift to the power-off state.

The number-of-copies display section 332 is an indicator for displaying the number of sheets to be printed, including sheets to be copied. The number-of-copies display section 332 is formed by seven segments of LEDs and can display numbers of 0 to 9 by causing each segment as a component to be turned on and off. Further, the four sheet selection lamps 333 to 336 are provided adjacent to the number-of-copies display section 332.

The sheet selection lamp 333 labelled with a sheet selection option of "A4" is on in a case where an A4-sheet is selected as the print sheet by a user. The sheet selection lamp 334 labelled with a sheet selection option of "LTR" is on in a case where a letter sheet is selected as the print sheet by the user. The sheet selection lamp 335 labelled with a sheet selection option of "4×6" is on in a case where a 4×6 sheet for photo printing is selected as the print sheet by the user. The sheet selection lamp 336 labelled with a sheet selection option of "*" is on in a case where a sheet having a sheet size and a sheet type (sheet settings) registered for use by a method described hereinafter is selected as the print sheet by the user. That is, in the present embodiment, the printer 300 can use a set of sheet settings, which is associated with one sheet size (sheet type) predetermined without user's selection, out of sheet settings sets corresponding to the sheet selection lamps 333 to 335, respectively. Further, in the present embodiment, the printer 300 can also use a set of sheet settings, which corresponds to the sheet selection lamp 336 and is associated with one sheet size selected by the user from a plurality of sheet sizes.

Thus, the illustrated example in FIG. 3 takes the form in which the four sheet selection lamps are disposed at locations adjacent to the respective sets of sheet settings of "A4", "LTR", "4×6", and "*" which are physically printed or inscribed on the operation panel 305. However, a form different from this may be employed insofar as it can expressly display the sheet settings set currently selected by the user. For example, the operation panel 305 may be configured such that a lamp is incorporated in the notation itself of each sheet size, whereby a selected sheet is indicated by lighting on or off the notation. Further, the configuration may be such that a selected sheet is indicated using means other than an LED lamp.

The sheet selection key 337 is for changing the sheet settings being currently set for the printer 300 by sequentially switching selection of the above-mentioned four sheet settings sets. A user sets a sheet settings set for the printer 300, which is associated with sheets currently set for the printer 300, by operating the sheet selection key 337. This causes the printer 300 to perform printing on sheets corresponding to the sheet settings set currently set for the printer 300. The OK key 338 is used to finally determine the sheet size for which one of the four sheet selection lamps is currently on (currently selected by the user). Besides for this, the OK key 338 is also sometimes used for another use according to the operating state of the printer 300.

The monochrome start key 339 and the color start key 340 are for starting a print operation, such an operation of the copy function, which is an operation performed by the printer 300 alone. When the monochrome start key 339 is pressed in a power-on and standby state, a monochrome copy operation is started in the printer 300. Further, when the color start key 340 is pressed in the power-on and standby state, a color copy operation is started in the printer 300. Further, the monochrome start key 339 and the color start key 340 are sometimes used to perform another operation or processing, according to an apparatus state of the printer 300 or a combination operation with another key.

The stop key 341 is a key for interrupting an operation or processing being executed to return the printer 300 to the standby state. When the stop key 341 is pressed in an error state of the printer 300, release of an error of the printer 300, cancelation of a job being executed, or the like is performed.

The error lamp 342 is a lamp which is off when the printer 300 is in the normal state and turns on or blinks when an error occurs in the printer 300. Errors occurring in the printer 300 include a plurality of types, such as a no ink error, an out-of-paper error, and a paper jam error, and hence the error lamp 342 can notify a user of a type of the error currently occurring in the printer 300 by changing the blinking pattern. Further, by controlling the display of the number-of-copies display section 332 in combination the turn-on or blinking of the error lamp 342, it is also possible to notify a user of a type of the error and an error handling method.

Figure 4B:
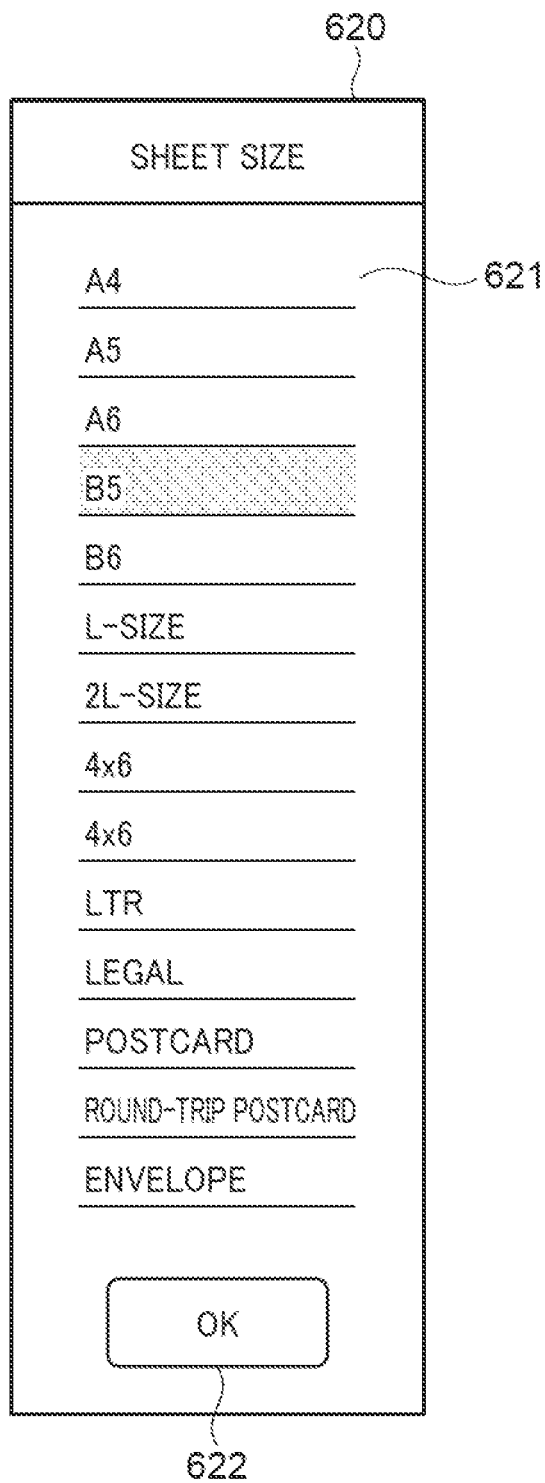
Figure 4C:
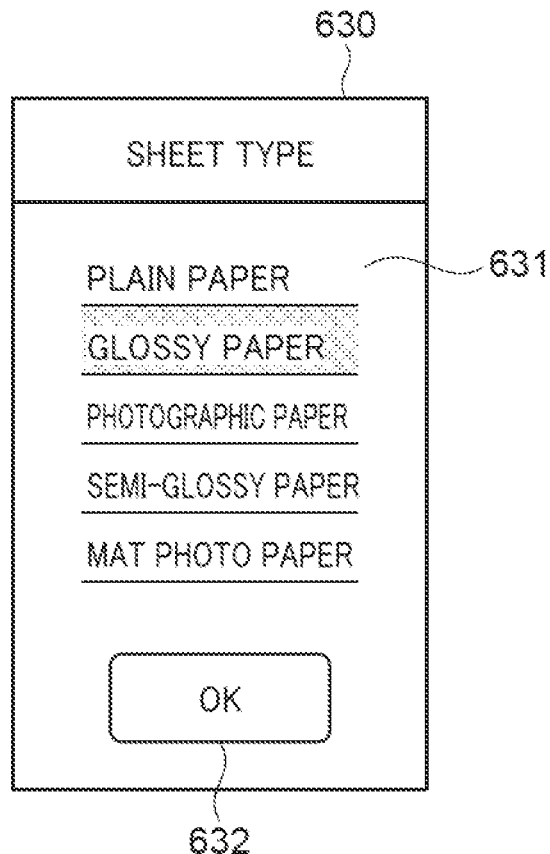

FIGS. 4A to 4C are diagrams each showing a sheet information-setting screen 600 of a remote user interface.

The remote user interface (display section) is a screen corresponding to an operation screen of the printer 300 and is a user interface displayed by the printer 300 on a display section of an external terminal apparatus, such as the smartphone 500 or the client terminal 401. The printer 300 distributes, as a Web server, remote user interface contents stored therein to an external terminal apparatus, whereby the external terminal apparatus displays the remote user interface using a Web browser function and receives an operation from a user via the interface. Note that based on the received operation, the external terminal apparatus transmits an instruction based on the received operation to the printer 300 as required. With this, the printer 300 executes processing based on the operation received by the external terminal apparatus via the remote user interface. The processing based on the operation received by the external terminal apparatus via the remote user interface is, more specifically, e.g. processing for determining one of a plurality of sheet information items as the sheet information corresponding to the sheet selection lamp 336, as will be described hereinafter.

FIG. 4A is a diagram showing the configuration of a main screen of the sheet information-setting screen 600.

The sheet information-setting screen 600 includes sheet information display sections 601 to 604 which correspond to the four sheet selection lamps 333 to 336 provided on the operation panel 305 of the printer 300, and display four sheet information items, respectively, in a list, each formed by settings of the sheet size and the sheet type.

On the sheet information display section 601, "BODY PANEL SPECIFICATION: A4" as the sheet information corresponding to the sheet selection lamp 333 is displayed.

On the sheet information display section 602, "BODY PANEL SPECIFICATION: LTR" as the sheet information corresponding to the sheet selection lamp 334 is displayed.

On the sheet information display section 603, "BODY PANEL SPECIFICATION: 4×6" as the sheet information corresponding to the sheet selection lamp 335 is displayed.

On the sheet information display section 604 (registered sheet information display section), "BODY PANEL SPECIFICATION: *" as the sheet information corresponding to the sheet selection lamp 336 is displayed. A sheet size-changing button 605 is provided adjacent to the display of the sheet size of the sheet information display section 604. When a user presses the sheet size-changing button 605, a sheet size selection screen 620 (see FIG. 4B) is displayed. The user can select a desired one of a plurality of sheet sizes 621 on the sheet size selection screen 620 to change the sheet size associated with the sheet selection lamp 336 to the selected sheet size. That is, the plurality of sheet sizes 621 are a plurality of sheet settings which can be set on the remote user interface as one of the sheet settings associated with the sheet selection lamp 336. In other words, the plurality of sheet sizes 621 are candidates of one of the sheet settings set on the remote user interface as the one of the sheet settings associated with the sheet selection lamp 336. On the lowest part of the sheet size selection screen 620, there is provided an OK button 622. When the OK button 622 is pressed, a sheet size selected on the sheet size selection screen 620 is set as a sheet size associated with the sheet selection lamp 336, and the displayed screen returns to the sheet information-setting screen 600. Similarly, a sheet type-changing button 606 is provided adjacent to the display of the sheet type of the sheet information display section 604. When the user presses the sheet type-changing button 606, a sheet type selection screen 630 (see FIG. 4C) is displayed, and the user can select a desired one of a plurality of sheet types on this screen to change the sheet type associated with the sheet selection lamp 336 to the selected sheet type. On the lowest part of the sheet type selection screen 630, there is provided an OK button 632. When the OK button 632 is pressed, a sheet type selected on the sheet size selection screen 620 is set as a sheet type associated with the sheet selection lamp 336, and the displayed screen returns to the sheet information-setting screen 600.

On the lowest part of the sheet information-setting screen 600, there are arranged an OK button 610 and a cancel button 611. When the OK button 610 is pressed, the information on the sheet size and the sheet type of a registered sheet, whose settings have been changed by the user using the sheet size selection screen 620 (see FIG. 4B) and the sheet type selection screen 630 (see FIG. 4C), is reflected on the printer 300, and the display of the sheet information-setting screen 600 is terminated. When the cancel button 611 is pressed, the information on the sheet size and the sheet type of the registered sheet, whose settings have been changed by the user, is discarded, and the display of the sheet information-setting screen 600 is terminated without reflecting on the printer 300 these information items which have been changed.

FIG. 5 is a block diagram showing a hardware configuration of the printer 300.

Referring to FIG. 5, the printer 300 includes a main board 310 that controls the overall operation of the apparatus, a wireless LAN unit 308, the short-range wireless communication unit 306, and the operation panel 305.

The main board 310 includes a central processing unit (CPU) 311, a program memory 313, a data memory 314, a scanner mechanism control circuit 315, a print mechanism control circuit 317, a wireless LAN control circuit 318, a short-range wireless communication control circuit 319, and an operation section control circuit 320. These devices are interconnected via an internal bus 312.

The CPU 311 is a microprocessor that controls the devices in the main board 310, and the program memory 313 is a read only memory (ROM) and stores control programs. The data memory 314 is a random access memory (RAM) and includes an image memory 316. The CPU 311 operates according to the control programs stored in the program memory 313 and a variety of data stored in the data memory 314.

The scanner mechanism control circuit 315 controls the scanner mechanism to read an image of an original under the control of the CPU 311. The image of the original, read here, is stored in the image memory 316 included in the data memory 314.

The print mechanism control circuit 317 prints an image stored in the image memory 316 included in the data memory 314 on a recording medium under the control of the CPU 311.

The wireless LAN control circuit 318 controls, under the control of the CPU 311, the wireless LAN unit 308 connected thereto, to connect to the above-described access point to participate in the LAN 102, and thereby communicate with another communication terminal apparatus.

The short-range wireless communication control circuit 319 controls, under the control of the CPU 311, the short-range wireless communication unit 306 connected thereto, to detect connection of another short-range wireless communication terminal and transmit and receive data to and from the other short-range wireless communication terminal.

The operation section control circuit 320 controls, under the control of the CPU 311, the operation panel 305 connected thereto, to display a state of the printer 300, display a function selection menu of the printer 300, and receive an operation from a user.

Figure 6:
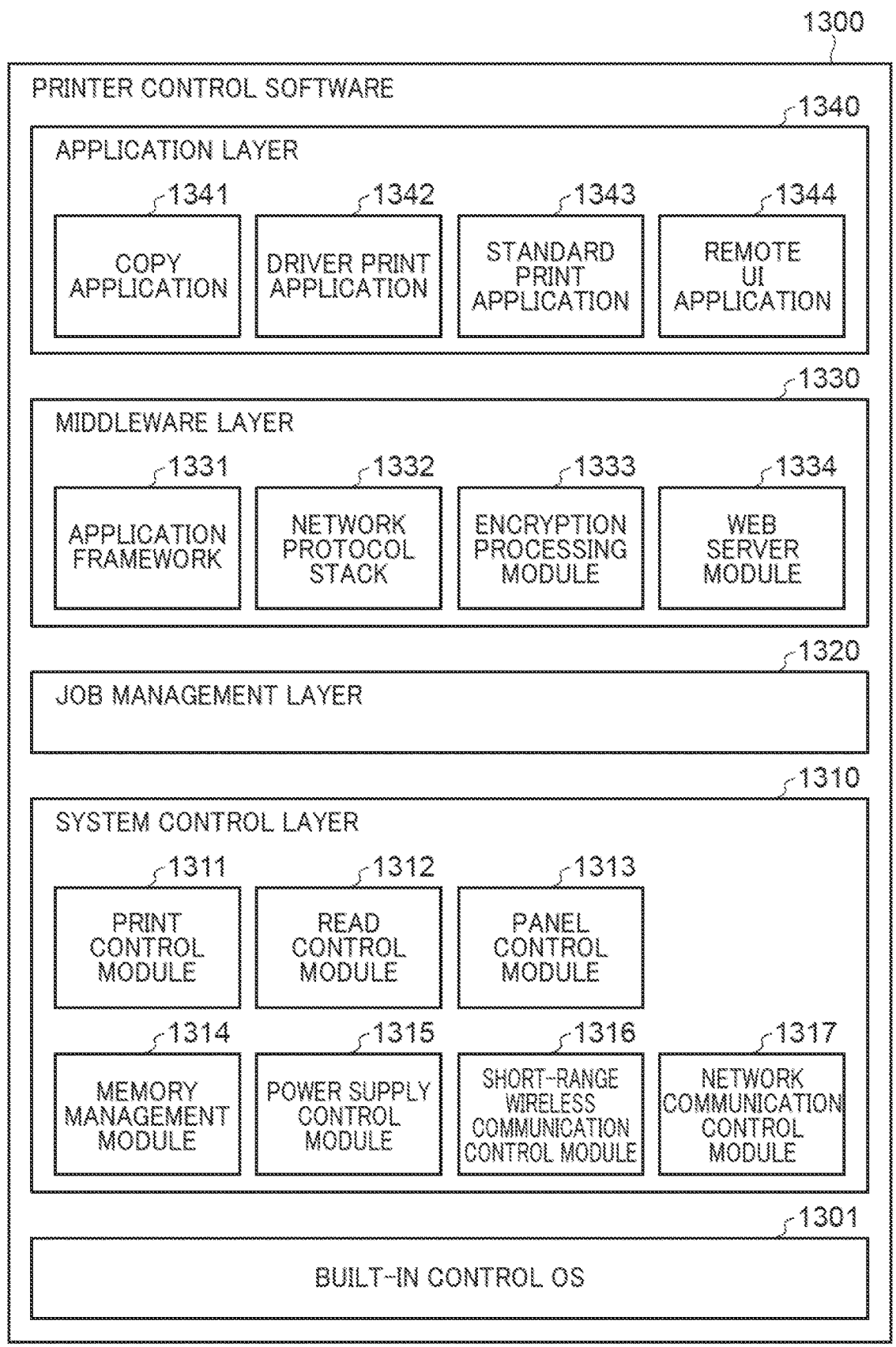
FIG. 6 is a diagram showing a module configuration of printer control software operating on the printer.

FIG. 6 is a diagram showing a module configuration of printer control software 1300 operating on the printer 300.

The printer control software 1300 operating on the printer 300 operates on a built-in control operating system (OS) 1301. Further, the modules of the printer control software 1300 are roughly classified into a system control layer 1310, a job management layer 1320, a middleware layer 1330, and an application layer 1340.

The built-in control OS 1301 is an OS that controls the basic operation of the printer control software 1300, and a real-time OS excellent in responsiveness is generally used.

The system control layer 1310 is formed by a control module group that mainly controls the hardware of the printer 300. Here, the system control layer 1310 includes a print control module 1311, a read control module 1312, a panel control module 1313, a memory management module 1314, a power supply control module 1315, a short-range wireless communication control module 1316, and a network communication control module 1317.

The print control module 1311 is a control module for controlling the print mechanism control circuit 317 for execution of the print operation of the printer 300. The read control module 1312 is a control module for controlling the scanner mechanism control circuit 315 for execution of the operation for reading an original placed on the original platen glass 301. The panel control module 1313 is a control module for controlling the display on the operation panel 305 of the printer 300 and detecting a variety of key operations. The memory management module 1314 is a control module for performing management, such as dynamic allocation of a variety of data items stored in the data memory 314. The power supply control module 1315 is a control module for performing power supply control for the printer 300, supplying electric power necessary for operation to each hardware block, and performing power-saving mode control. The short-range wireless communication control module 1316 (acquisition unit) is a control module for controlling the short-range wireless communication unit 306 for execution of short-range wireless communication with a terminal apparatus, such as the smartphone 500, so as to perform acquisition of a job and the like. The network communication control module 1317 (acquisition unit) is a control module for controlling the wireless LAN unit 308 for communication with an external terminal apparatus and thereby perform control of a communication physical layer so as to perform acquisition of a job and the like.

The job management layer 1320 is formed by a module group for executing a variety of operations by using the system control layer 1310, while performing hardware resource allocation, exclusive control, scheduling, and so forth, in response to job execution requests from an upper layer.

The middleware layer 1330 is positioned between the application layer 1340 and the job management layer 1320, and is formed by a module group commonly used by a plurality of function modules included in the application layer 1340. Here, the middleware layer 1330 includes an application framework 1331, a network protocol stack 1332, an encryption processing module 1333, and a Web server module 1334.

The application framework 1331 is a framework module commonly used when job execution is requested from the application layer 1340 to the job management layer 1320. The network protocol stack 1332 is a module for performing communication based on a variety of network protocols, such as HTTP and TCP/IP. The encryption processing module 1333 is a module for performing encryption and decryption processing necessary for network communication and the like. The Web server module 1334 is a module for causing the printer 300 to operate as the Web server to distribute the remote user interface contents.

The application layer 1340 is formed by an application group for realizing a variety of functions of the printer 300. Here, the application layer 1340 includes a copy application 1341, a driver print application 1342, a standard print application 1343, and a remote user interface application 1344.

The copy application 1341 is an application module for executing a copy operation for reading an original and printing read data. The driver print application 1342 is an application module for receiving jobs from printer drivers of the smartphone 500 and the client terminal 401 and executing associated operations. The jobs received from these printer drivers include a print job for executing a print operation, a scan job for reading an original and outputting image data, a maintenance job for configuring and managing the printer 300 by exchanging information with an external terminal apparatus, and so forth. The standard print application 1343 is an application module for receiving jobs from a standard print service included in the system of the smartphone 500 and executing associated operations. The jobs received from the standard print service include a print job for executing a print operation and a scan job for reading an original and outputting image data. However, the standard print service is provided by a smartphone maker and a standard OS vendor, and hence there is restriction that it is impossible to perform specific setting and management unique to a printer model of each maker. The remote user interface application 1344 is a module for providing the remote user interface function equipped in the printer 300 to an external terminal apparatus using the Web server module 1334. By using the remote user interface, the external terminal apparatus is enabled to perform setting and management of the printer 300. Particularly, in the printer 300 described in the present embodiment, the information which can be displayed and set on the operation panel 305 is limited, and hence the remote user interface is used to perform more detailed setting and management. Further, in a case where a dedicated driver is not available in the smartphone 500 and the client terminal 401, only the standard print service can be used, and hence the use of the remote user interface is essential to perform the detailed setting and management.

Figure 7:
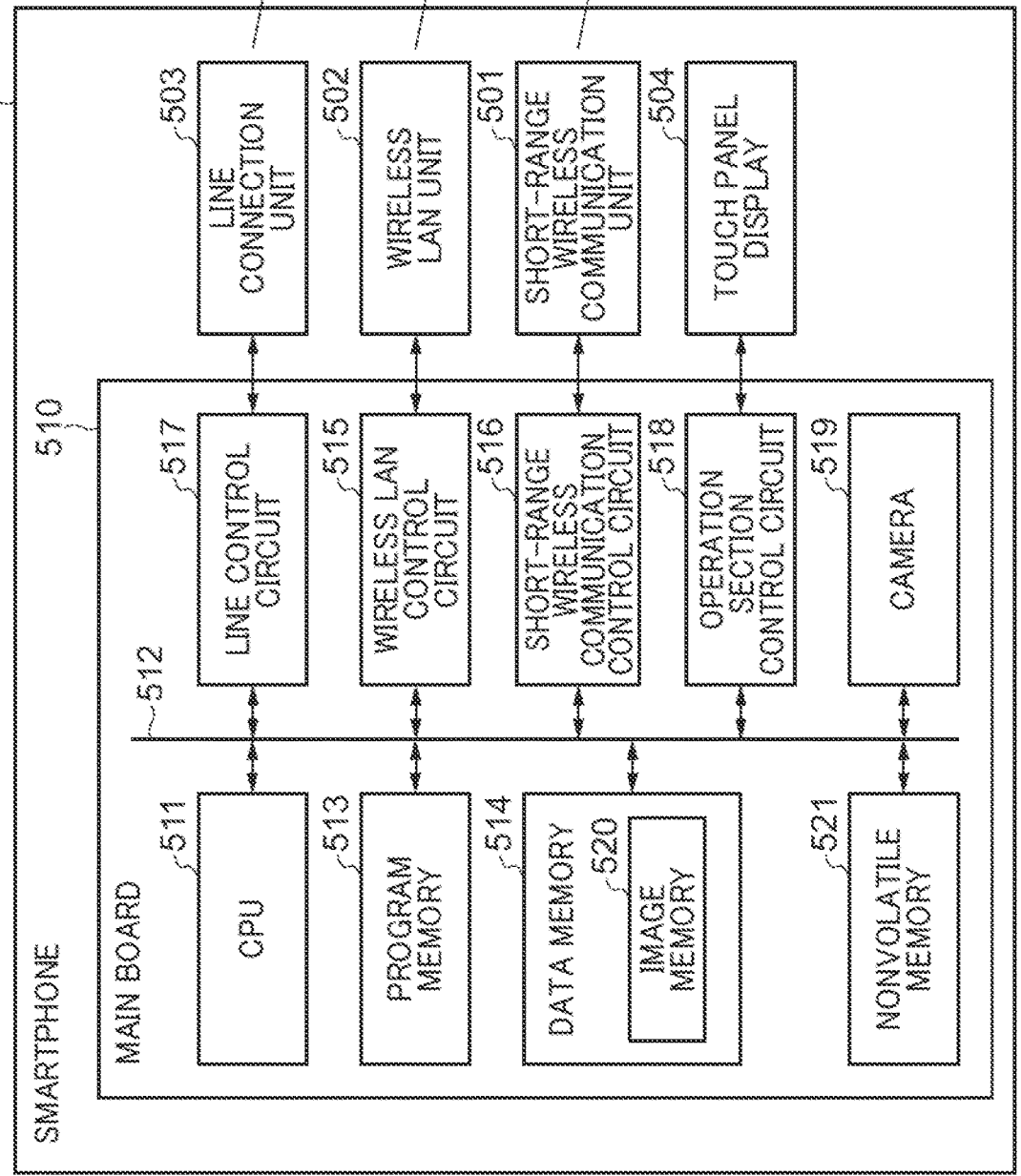
FIG. 7 is a block diagram showing a hardware configuration of a smartphone appearing in FIG. 1.

FIG. 7 is a block diagram showing a hardware configuration of the smartphone 500.

Referring to FIG. 7, the smartphone 500 includes a main board 510 that controls the overall operation of the apparatus, a wireless LAN unit 502, a short-range wireless communication unit 501, a line connection unit 503, and a touch panel display 504.

The main board 510 includes a CPU 511, a program memory 513, a data memory 514, a wireless LAN control circuit 515, a short-range wireless communication control circuit 516, a line control circuit 517, an operation section control circuit 518, a camera 519, and a nonvolatile memory 521. These devices are interconnected via an internal bus 512.

The CPU 511 is a microprocessor that controls the devices in the main board 510, and the program memory 513 is a ROM and stores control programs. The data memory 514 is a RAM and includes an image memory 520. The CPU 511 operates according to the control programs stored in the program memory 513 and a variety of data stored in the data memory 514.

The wireless LAN control circuit 515 controls, under the control of the CPU 511, the wireless LAN unit 502 connected thereto, to connect to the above-described access point to participate in the LAN 102, and thereby communicate with another communication terminal apparatus.

The short-range wireless communication control circuit 516 controls, under the control of the CPU 511, the short-range wireless communication unit 501 connected thereto, to detect connection of another short-range wireless communication terminal and transmit and receive data to and from the other short-range wireless communication terminal.

The line control circuit 517 controls the line connection unit 503 connected thereto, to connect to the mobile phone network 105 to perform a call and data transmission/reception under the control of the CPU 511.

The operation section control circuit 518 performs, under the control of the CPU 511, desired display on the touch panel display 504 connected thereto, and receives an operation from a user.

The camera 519 photographs, under the control of the CPU 511, an image and stores the photographed image in the image memory 520 included in the data memory 514. Further, not only the image photographed by the camera 519, but also images acquired from the outside via the mobile phone line, the LAN 102, and the short-range wireless communication 101 are stored in the image memory 520, and these images can be reversely transmitted from the image memory 520 to the outside.

The nonvolatile memory 521 is implemented e.g., by a flash memory and stores data which is desired to be stored even after the power is turned off. The nonvolatile memory 521, stores, for example, not only address book data, a variety of communication connection information items, information on devices connected in the past, and so forth, but also image data desired to be stored, application software for realizing a variety of functions on the smartphone 500, and so forth.

Figure 8:
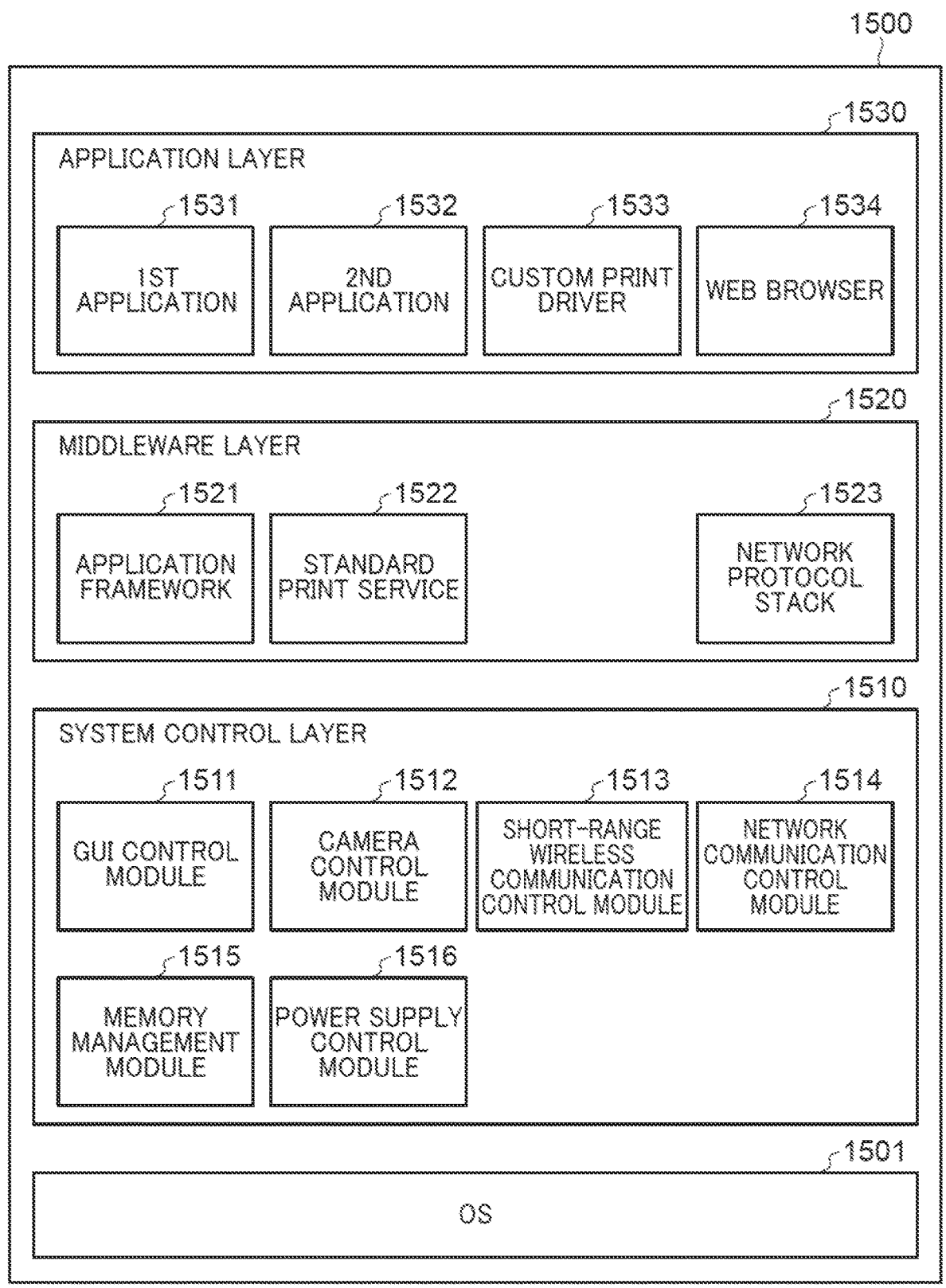
FIG. 8 is a diagram showing a module configuration of software operating on the smartphone.

FIG. 8 is a diagram showing a module configuration of software 1500 operating on the smartphone 500. Note that although in the present embodiment, the apparatus on which the software 1500 operates is the smartphone 500, this is not limitative, but for example, the apparatus on which the software 1500 operates may be the client terminal 401 or the digital camera 402 insofar as it is an external terminal apparatus that can communicate with the printer 300.

The software 1500 operating on the smartphone 500 operates on an operating system (OS) 1501. Further, the modules of the software 1500 are roughly classified into a system control layer 1510, a middleware layer 1520, and an application layer 1530.

The OS 1501 is an OS that controls the basic operation of the software 1500.

The system control layer 1510 is mainly formed by a module group that controls the hardware of the smartphone 500. Here, the system control layer 1510 includes a graphical user interface (GUI) control module 1511, a camera control module 1512, a short-range wireless communication control module 1513, a network communication control module 1514, a memory management module 1515, and a power supply control module 1516.

The GUI control module 1511 is a control module for controlling the display on the touch panel display 504 and detecting a user operation on the touch panel display 504. The camera control module 1512 is a module for controlling photographing performed by the camera 519. The short-range wireless communication control module 1513 is a control module for controlling the short-range wireless communication module 501 to perform short-range wireless communication with another apparatus, such as the printer 300. The network communication control module 1514 is a control module for controlling the wireless LAN unit 502 to connect to the above-described access point to participate in the LAN 102, and thereby perform communication physical layer control for performing communication with an external terminal apparatus. The memory management module 1515 is a control module for performing management, such as dynamic allocation of a variety of data items stored in the data memory 514. The power supply control module 1516 is a control module for performing power supply control for the smartphone 500 to supply electric power necessary for operation to each hardware block and perform power-saving mode control.

The middleware layer 1520 is positioned between the application layer 1530 and the system control layer 1510 and is formed by a module group commonly used by a plurality of function modules included in the application layer 1530. Here, the middleware layer 1520 includes an application framework 1521, a standard print service 1522, and a network protocol stack 1523.

The application framework 1521 is a framework module commonly used when execution of a job is requested from the application layer 1530 to the system control layer 1510. The network protocol stack 1523 is a module for performing communication based on a variety of network protocols, such as HTTP and TCP/IP. The standard print service 1522 is a service module for generating a standard job to provide functions using the printer 300, which are associated with the standard print service 1522, to the applications of the application layer 1530. The functions provided by the standard print service 1522 include a print function of causing the printer 300 to execute a standard print job generated as a standard job, a scan function of causing the printer 300 to execute a standard scan job generated as a standard job, and so forth. However, the standard print service is provided by a smartphone maker or a standard OS vendor, and hence there is restriction that it is impossible to perform specific setting and management unique to a printer model of each maker.

The application layer 1530 is formed by an application group for realizing a variety of functions of the smartphone 500, and the like. Here, the application layer 1530 includes a first application 1531, a second application 1532, a custom print driver 1533, and a Web browser 1534.

The applications installed in the smartphone 500 include those incorporated at the time of product shipment and those which can be downloaded and introduced by a user afterwards. Although FIG. 8 shows the first application 1531 and the second application 1532 as the applications installed in the smartphone 500 by way of example, the number and types of applications installed in the smartphone 500 are not limited, and the user can add and delete applications as required. The custom print driver 1533 is a dedicated driver prepared for the model type of the printer 300 and provides functions for executing a print job and a scan job to the associated printer 300. The user selects and installs a print driver associated with the model type of the printer 300 used by himself/herself as the custom print driver 1533. Note that although the custom print driver 1533 is illustrated here as installed in the application layer 1530 by way of example, the custom print driver 1533 may be configured to be installed in the middleware layer 1520 and operate according to a print job request received from an application. The Web browser 1534 is an application module for connecting to a Web server via the LAN 102 to acquire Web contents and display the acquired Web contents. The Web browser 1534 can acquire Web contents from the cloud server 200 and display the acquired Web contents, and acquire and display remote user interface contents distributed from the printer 300.

FIG. 9 is a diagram showing a data structure of sheet information settings 5000 of the printer 300.

The sheet information settings 5000 is formed by sheet settings selection values 5001 of 1 to 4 and sheet information data sets 5002 to 5005 corresponding to the four types of sheet information items, respectively, described with reference to FIGS. 4A to 4C.

The sheet information data sets 5002 to 5005 have sheet size fields 5006, 5008, 5010, and 5012 each for storing a sheet size, and sheet type fields 5007, 5009, 5011, and 5013 each for storing a sheet type, respectively. Further, values of 1 to 4, which correspond to the sheet settings selection values 5001, respectively, are assigned to the sheet information data sets 5002 to 5005, as respective IDs.

IDs for identifying respective sheet sizes are stored in the sheet size fields 5006, 5008, 5010, and 5012, respectively. Here, the sheet sizes listed on the sheet size selection screen 620 shown in FIG. 4B have values of 1 to 14 sequentially assigned thereto from the top of the list, as respective IDs. For example, the sheet size set for the sheet information data set 5002 (specified sheet option) is A4 which is a sheet size of the sheet settings specified in advance, and hence the value of an ID stored in the sheet size field 5006 is fixed to the default value of "1". Further, the sheet sizes set for the sheet information data sets 5003 and 5004 are LTR and 4×6 which are sheet sizes of the sheet settings specified in advance. Therefore, the values of IDs stored in the sheet size fields 5008 and 5010 are fixed to the default values of "10" and "8", respectively. Note that in the sheet size field 5012 in the sheet information data set 5005 (registered sheet option), a value of 0 is stored in a case where no sheet size is set, and in a case where a sheet size is set by a user, a desired one of the ID values of 1 to 14, for identifying the set sheet size, is stored.

Further, in the sheet type fields 5007, 5009, 5011, and 5013, IDs for identifying sheet types are stored, respectively. Here, the sheet types listed on the sheet type selection screen 630 shown in FIG. 4C have values of 1 to 5 sequentially assigned thereto from the top of the list, as respective IDs. For example, the sheet type set for the sheet information data set 5002 is plain paper which is a sheet type of the sheet settings specified in advance, and hence the value of an ID stored in the sheet type field 5007 is fixed to the default value of "1". Similarly, the sheet types set for the sheet information data sets 5003 and 5004 are plain paper and glossy paper which are sheet types of the sheet settings specified in advance, and hence the values of IDs stored in the sheet type fields 5009 and 5011 are fixed to the default values of "1" and "2", respectively. Note that in the sheet type field 5013 in the sheet information data set 5005, a value of 0 is stored in a case where no sheet type is set, and in a case where a sheet type is set by a user, a desired one of the ID values of 1 to 5, for identifying the set sheet type, is stored.

When the printer 300 is operated, a sheet information data set having an ID corresponding to a selected one of the sheet settings selection values 5001 is referred to, whereby the sheet size and the sheet type to be used are determined. For example, in a case where the sheet settings selection value 5001 of "1" is selected, the sheet information data set 5002 is referred to, and the sheet size "A4" and the sheet type "plain paper" are determined as the sheet size and the sheet type to be used when the printer 300 is operated.

The sheet information settings 5000 having the data structure shown in FIG. 9 is stored in the data memory 314 and initialized at the start of the printer 300 for use. The set ID values are stored in the nonvolatile memory from which the data is not deleted even after the power supply to the printer 300 is cut off.

Figure 10:
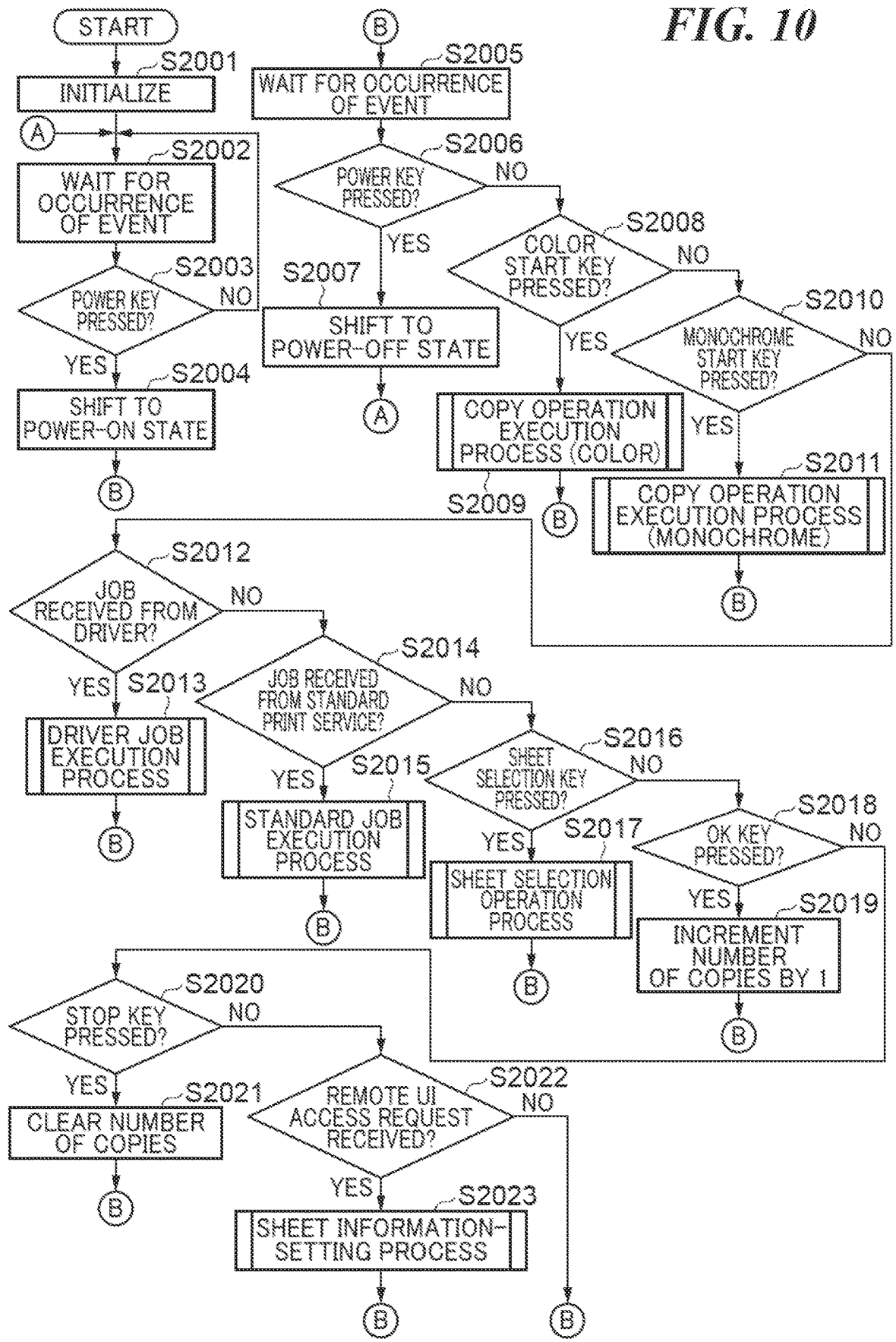
FIG. 10 is a flowchart of an event process performed by the printer.

FIG. 10 is a flowchart of an event process performed by the printer 300. When the AC power is supplied to the printer 300, the CPU 311 of the printer 300 starts execution of the event process by reading a program thereof from the program memory 313.

First, in a step S2001, the related hardware components and the data memory 314 of the printer 300 are initialized. In this step, the printer 300 is shifted to the power-off state waiting for a power-on operation, and the process proceeds to a step S2002.

In the step S2002, the CPU 311 waits for occurrence of an event in the power-off state, and when an event occurs, the process proceeds to a step S2003. Examples of the event whose occurrence is monitored for here include a user's operation of pressing the power key 330. In the present process, a different branching process is performed according to an occurred event.

In the step S2003, if it is detected that the occurred event is the operation of pressing the power key 330 (YES to the step S2003), the process proceeds to a step S2004, wherein the printer 300 is shifted to the power-on state, and the process proceeds to a step S2005. Otherwise (NO to the step S2003), the process returns to the step S2002, wherein the CPU 311 waits for occurrence of the next event.

In the step S2005, the CPU 311 waits for occurrence of an event in the power-on state, and when an event occurs, the process proceeds to a step S2006. Examples of the event whose occurrence is monitored for here include a user's operation of pressing the power key 330 and a key operation on the operation panel 305. Further, reception of job data from an external terminal apparatus via the short-range wireless communication, a remote user interface access request from an external terminal apparatus to the Web server module 1334 of the printer 300, and so forth are also included in the examples of the event. In the present process, a different branching process is performed according to an occurred event.

In the step S2006, if it is detected that the occurred event is the operation of pressing the power key 330 (YES to the step S2006), the process proceeds to a step S2007, wherein the printer 300 is shifted to the power-off state, and then the process returns to the step S2002. Otherwise (NO to the step S2006), the process proceeds to a step S2008.

In the step S2008, if it is detected that the occurred event is an operation of pressing the color start key 340 (YES to the step S2008), the process proceeds to a step S2009, wherein a copy operation execution process (color), described hereinafter, is executed, and then the process returns to the step S2005. Otherwise (NO to the step S2008), the process proceeds to a step S2010.

In the step S2010, if it is detected that the occurred event is an operation of pressing the monochrome start key 339 (YES to the step S2010), the process proceeds to a step S2011, wherein a copy operation execution process (monochrome), described hereinafter, is executed, and then the process returns to the step S2005. Otherwise (NO to the step S2010), the process proceeds to a step S2012.

In the step S2012, if it is detected that the occurred event is reception of a driver job from the custom print driver 1533 of the smartphone 500 (YES to the step S2012), the process proceeds to a step S2013, wherein a driver job execution process is executed, and then the process returns to the step S2005. Otherwise (NO to the step S2012), the process proceeds to a step S2014. Note that details of the driver job execution process will be described hereinafter.

In the step S2014, if it is detected that the occurred event is reception of a standard job from the standard print service 1522 of the smartphone 500 (YES to the step S2014), the process proceeds to a step S2015, wherein a standard job execution process, described hereinafter, is executed, and then the process returns to the step S2005. Otherwise (NO to the step S2014), the process proceeds to a step S2016.

In the step S2016, if it is detected that the occurred event is an operation of pressing the sheet selection key 337 (YES to the step S2016), the process proceeds to a step S2017, wherein a sheet selection operation process, described hereinafter, is executed, and then the process returns to the step S2005. Otherwise (NO to the step S2016), the process proceeds to a step S2018.

In the step S2018, if it is detected that the occurred event is an operation of pressing the OK key 338 (YES to the step S2018), the process proceeds to a step S2019, wherein the number (the number of copies) displayed on the number-of-copies display section 332 is incremented by 1, and then the process returns to the step S2005. This number of copies is used when the copy operation is executed. Otherwise (NO to the step S2018), the process proceeds to a step S2020.

In the step S2020, if it is detected that the occurred event is an operation of pressing the stop key 341 (YES to the step S2020), the process proceeds to a step S2021, wherein the number (the number of copies) displayed on the number-of-copies display section 332 is cleared and set to the initial value of 1, and then the process returns to the step S2005. Otherwise (NO to the step S2020), the process proceeds to a step S2022.

In the step S2022, if it is detected that the occurred event is a remote user interface access request from the Web browser 1534 of the smartphone 500 to the Web server module 1334 of the printer 300 (YES to the step S2022), the process proceeds to a step S2023. Otherwise (NO to the step S2022), the process directly returns to the step S2005.

In the step S2023, a sheet information-setting process is executed, and then the process returns to the step S2005. Note that details of the sheet information-setting process will be described hereinafter.

Figure 11:
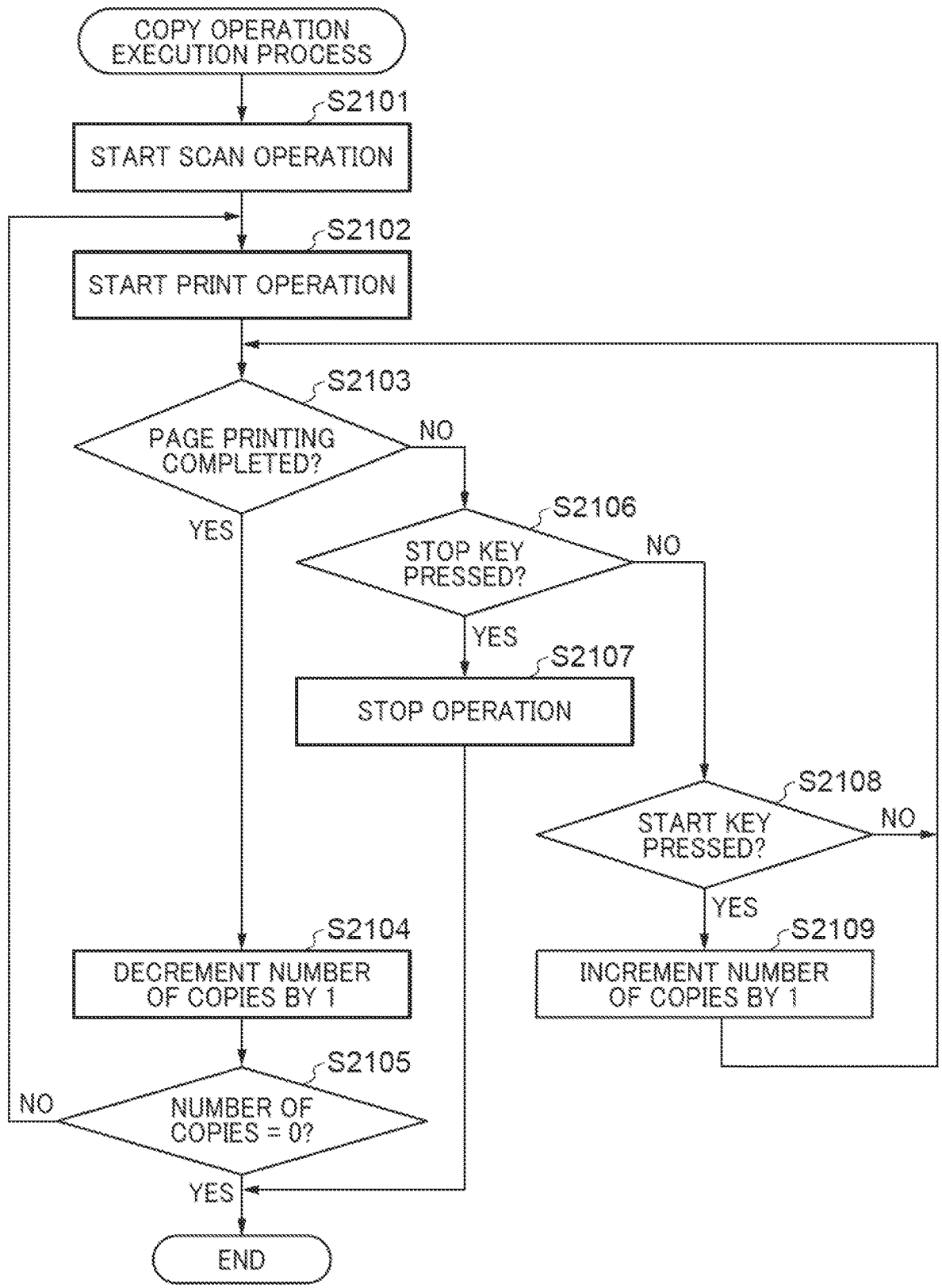
FIG. 11 is a flowchart of a copy operation execution process in a step in FIG. 10.

FIG. 11 is a flowchart of the copy operation execution process in the step S2009 and the step S2011 in FIG. 10. Note that although color copy is executed in the copy operation execution process in the step S2009, and monochrome copy is executed in the copy operation execution process in the step S2011, these processes are different only in that the scan and print operations are executed for color or for monochrome, but there is no difference in the flowchart in FIG. 11. In the present process, the sheet information data set having an ID corresponding to a selected one of the sheet settings selection values 5001 is referred to, whereby the sheet size and the sheet type to be used are determined. These settings are used for the size of originals to be read in a scan operation, and the sheet size and the sheet type in a print operation.

First, in a step S2101, the scanner mechanism in the printer 300 is operated to start the operation of reading an original placed on the original platen glass 301.

In the next step S2102, the print mechanism is operated to start the operation for printing one page of the read image. Note that the reading operation and the printing operation are executed as different processes operating on the real-time OS and executed in parallel with the present process. The CPU 311 executes the following process while monitoring the status of execution of these different processes.

In a step S2103, the CPU 311 checks whether or not the operation for printing one page (page print) is completed. If the operation for printing one page is completed (YES to the step S2103), the process proceeds to a step S2104, wherein the number (the number of copies) displayed on the number-of-copies display section 332 is decremented by 1, and the process proceeds to a step S2105.

In the step S2105, the CPU 311 checks whether or not the number of copies is equal to 0, i.e. whether or not printing of the set number of copies is completed. If the number of copies is equal to 0 (YES to the step S2105), the present process is terminated, whereas if the number of copies is not equal to 0 (NO to the step S2105), the process returns to the step S2102, and the operation for printing the next page is started.

On the other hand, if it is determined in the step S2103 that completion of the operation for printing one page is being continuously monitored (NO to the step S2103), the process proceeds to a step S2106 to check whether or not one of the plurality of events has occurred.

In the step S2106, if the event of pressing the stop key 341 has been detected (YES to the step S2106), the process proceeds to a step S2107, wherein the print operation being executed is stopped, followed by terminating the present process. On the other hand, if the event of pressing the stop key 341 has not been detected (NO to the step S2106), the process proceeds to a step S2108.

In the step S2108, if the event of pressing the monochrome start key 339 or the color start key 340 has been detected (YES to the step S2108), the process proceeds to a step S2109, wherein the value of the number-of-copies display section 332 is incremented by 1, and then the process returns to the step S2103. Otherwise (NO to the step S2108), the process directly returns to the step S2103.

Figure 12:
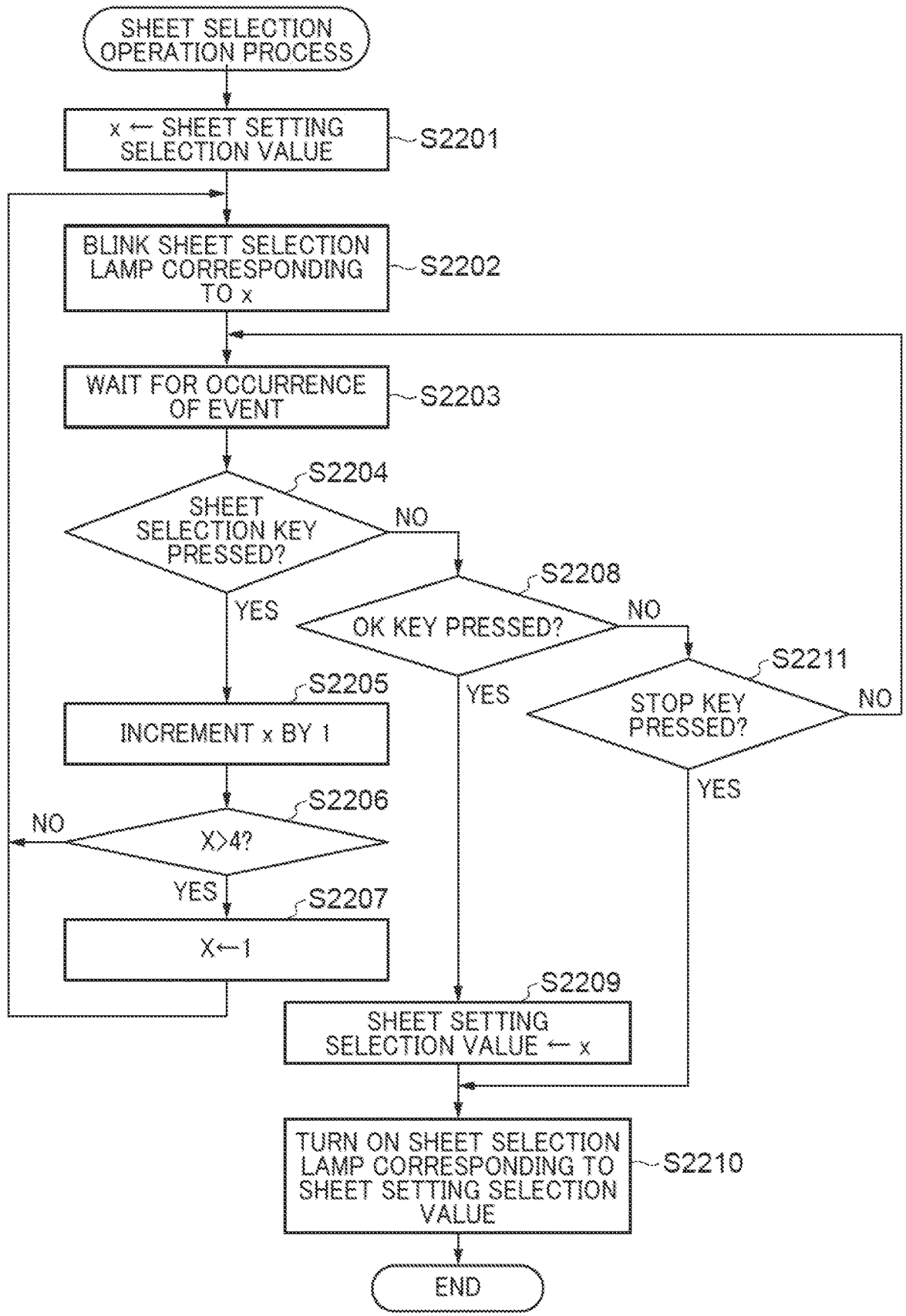
FIG. 12 is a flowchart of a sheet selection operation process in a step in FIG. 10.

FIG. 12 is a flowchart of the sheet selection operation process in the step S2017 in FIG. 10.

First, in a step S2201, the CPU 311 acquires the default value of the sheet settings selection values 5001 and stores the acquired value as a variable "x" in the work area in the data memory 314.

In the next step S2202, a lamp blinking operation is started in which one of the sheet selection lamps 333 to 336, which corresponds to the sheet settings selection value 5001 indicated by the variable "x", is blinked. Note that this lamp blinking operation is executed as another process operating on the real-time OS in parallel with the present process.

In the next step S2203, the CPU 311 waits for occurrence of an event, and when an event occurs, the process proceeds to a step S2204. The event whose occurrence is monitored for here is a key operation performed by the user on the operation panel 305. In the present process, a different branching process is performed according to an occurred event.

If it is detected in the step S2204 that the occurred event is the operation of pressing the sheet selection key 337 (YES to the step S2204), steps S2205 to S2207 are repeated to perform processing for sequentially switching the sheet selection values. More specifically, whenever the sheet selection key 337 is pressed, the process proceeds to a step S2205, wherein the variable "x" is incremented by 1. In the next step S2206, the CPU 311 checks whether or not the value of the variable "x" is larger than 4. As a result, if the value of the variable "x" is larger than 4 (YES to the step S2206), the process proceeds to a step S2207, wherein the value of 1 is substituted for the variable "x", and then the process returns to the step S2202 to blink one of the sheet selection lamps 333 to 336, which corresponds to the value of the updated variable, i.e. 1. Otherwise (NO to the step S2206), the process directly returns to the step S2202 to blink one of the sheet selection lamps 333 to 336, which corresponds to the updated variable "x".

On the other hand, if the occurred event is not the operation of pressing the sheet selection key 337 (NO to the step S2204), the process proceeds to a step S2208.

If it is detected in the step S2208 that the occurred event is the operation of pressing the OK key 338 (YES to the step S2208), steps S2209 and S2210 are executed, and the sheet selection performed by the user is finalized. More specifically, when the OK key 338 is pressed, the process proceeds to the step S2209, wherein the value of the variable "x" is substituted for the sheet settings selection value 5001. Then, in the step S2210, one of the sheet selection lamps 333 to 336, which correspond to the sheet settings selection value 5001 thus set, is turned on, followed by terminating the present process.

On the other hand, if the occurred event is not the operation of pressing the OK key 338 (NO to the step S2208), the process proceeds to a step S2211.

If it is detected in the step S2211 that the occurred event is the operation of pressing the stop key 341 (YES to the step S2211), the CPU 311 executes the step S2210 to perform processing for stopping the sheet selection operation performed by the user. More specifically, when the stop key 341 is pressed, the process proceeds to the step S2210, wherein one of the sheet selection lamps 333 to 336, which corresponds to the sheet settings selection value 500, is turned on, followed by terminating the present process. At this time, the present process is terminated without substituting the value of the variable "x" for the sheet settings selection value 5001, and hence the state of the printer 300 returns to that before starting the sheet selection operation.

FIG. 13 is a flowchart of the sheet information-setting process in the step S2023 in FIG. 10. As described above, the present process is executed in a case where a remote user interface access request from the Web browser 1534 of the smartphone 500 to the Web server module 1334 of the printer 300 is detected as the occurred event.

First, in a step S2301, a response to the remote user interface access request is transmitted to the Web browser 1534 of the smartphone 500. The contents of the response are those of the sheet information-setting screen 600 illustrated in FIG. 4A.

In a step S2302, the CPU 311 waits for occurrence of an event, and when an event occurs, the process proceeds to a step S2303. Examples of the event whose occurrence is monitored for here include a request from the smartphone 500, closing of a session or disconnection, and time-out. In the present process, a different branching process is performed according to an occurred event.

If it is detected in the step S2303 that the occurred event is a POST request from the smartphone 500 to the remote user interface (operation of a detection unit) (YES to the step S2303), the process proceeds to a step S2304.

In the step S2304, the CPU 311 updates the sheet information data set 5005 (see FIG. 9) which is the sheet information which can be registered by the user (operation of a registration unit). More specifically, the sheet size and the sheet type, selected by the user in the sheet information display section 604 on the sheet information-setting screen 600 (see FIG. 4A) of the remote user interface are described in the POST request detected in the step S2303. The sheet information data set 5005 appearing in FIG. 9 is updated based on the sheet size and the sheet type, described in this POST request.

On the other hand, if the occurred event is not a POST request from the smartphone 500 to the remote user interface (NO to the step S2303), the process proceeds to a step S2305.

If it is detected in the step S2305 that the occurred event is closing of a session or disconnection (YES to the step S2305), the present process is terminated, whereas if not (NO to the step S2305), the process proceeds to a step S2306.

If it is detected in the step S2306 that the occurred event is time-out (YES to the step S2306), the present process is similarly terminated, whereas if not (NO to the step S2306), the process returns to the step S2302. Note that the event of time-out is an event caused by processing of a timer incorporated in the printer 300 in a case where communication from the smartphone 500 has not been performed for a predetermined time period or more.

FIG. 14 is a diagram showing a command list 5100 used in a driver job generated by the custom print driver 1533 of the smartphone 500.

The driver job is formed by a command line which is generated based on one of predetermined command specifications in command list 5100 shown in FIG. 14. In the printer 300, the commands of the driver job from the smartphone 500, reception of which has been detected in the step S2012, are sequentially analyzed by the driver print application 1342, and processing operations corresponding to the analyzed commands are executed. Each command transmitted from the custom print driver 1533 to the printer 300 is comprised of a command number 5101, a date length 5102, and data 5103 of bytes in a number indicated by the data length.

The commands shown in FIG. 14, which are used in driver jobs, will be described in detail hereafter.

A job start command is a command to declare the start of a driver job and can pass the type of the driver job as data. A job end command is a command to declare the end of the driver job. A job cancel command is a command to stop operation during execution of the driver job and cancel the driver job.

A print job command group includes a print parameter setting command, a page start command, a print data transfer command, a page end command, and so forth.

The print parameter setting command is a command to designate a sheet size and a sheet type of sheets used in the print job and a print quality. The sheet size and the sheet type, designated in this command, are set on the GUI of the custom print driver 1533 of the smartphone 500 irrespective of the sheet selection selected by the printer 300. The page start command is a command to declare the start of a page image included in the print job. The print data transfer command is a command to transfer data, such as a bit image of the page image included in the print job. The page end command is a command to declare the end of the page image.

A scan job command group includes a scan parameter setting command, a scan execution start command, a scan stop command, and so forth, but detailed description of these commands is omitted.

A setting command group includes a registered sheet setting command, a setting reset command, and so forth.

The registered sheet setting command is a command to set the sheet information data set 5005 included in the sheet information settings 5000, which is sheet information that a user can register. This command includes the sheet size and the sheet type, selected by the user in the sheet information display section 604 of the sheet information-setting screen 600, described with reference to FIG. 4A, of the remote user interface displayed by the Web browser 1534 of the smartphone 500. The setting reset command is a command to reset the settings of the printer 300.

A maintenance command group includes an error release command, a head cleaning execution command, an ink replacement execution command, a printer power-off command, and so forth.

The error release command is a command to release an error occurring in the printer 300 to continue or stop the operation. The head cleaning execution command is a command to execute cleaning of a print head of the printer 300 so as to maintain the print quality. The ink replacement execution command is a command to execute a sequence for replacing an ink cartridge used in the printer 300. The printer power-off command is a command to shift the printer 300 to the power-off state.

Figure 15:
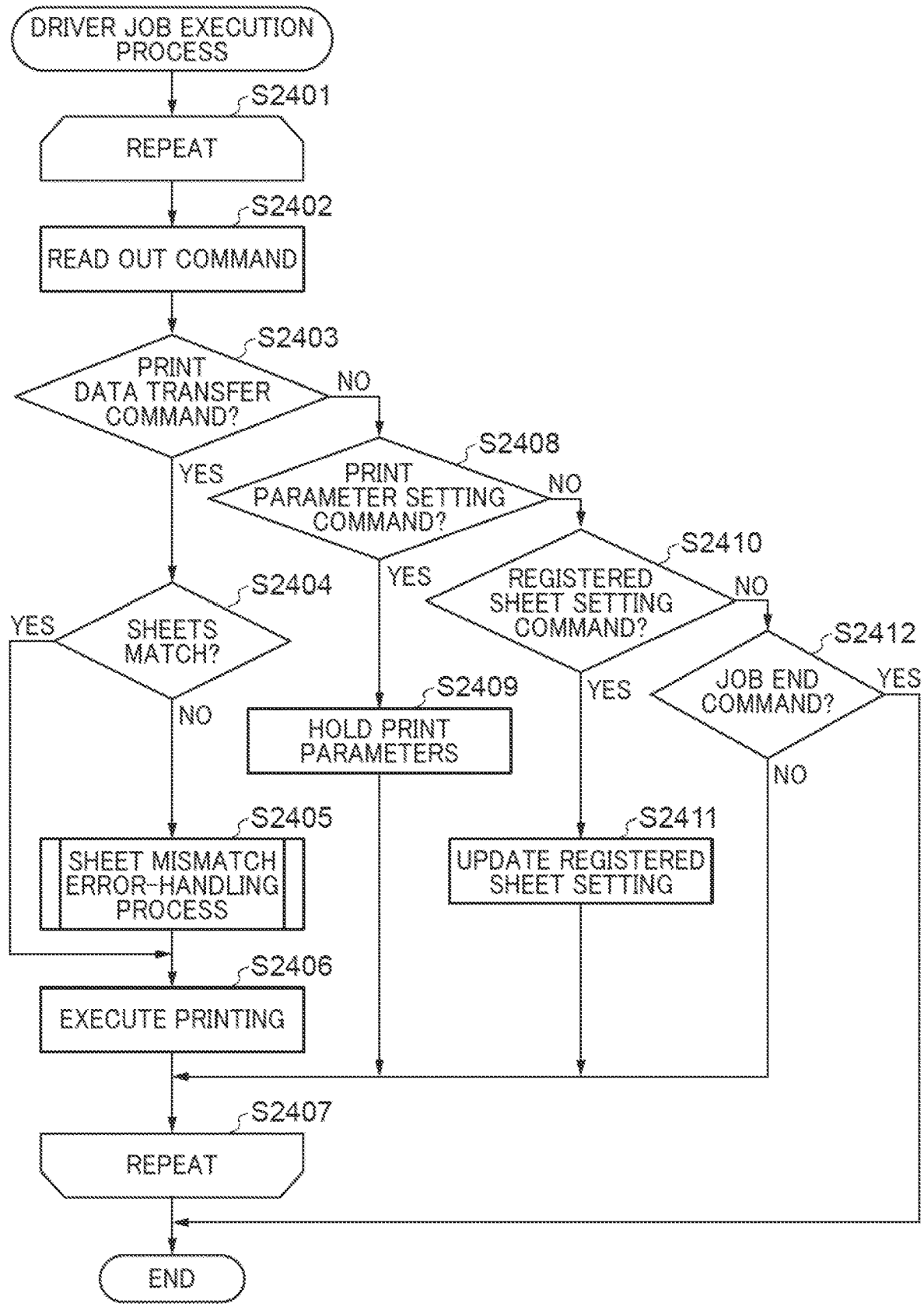
FIG. 15 is a flowchart of a driver job execution process in a step in FIG. 10.

FIG. 15 is a flowchart of the driver job execution process in the step S2013 in FIG. 10.

In the present process, as shown in FIG. 15, in a repeat loop of steps S2401 to S2407, the commands included in the received driver job are sequentially read out, and processing according to each read command is executed. Note that FIG. 15 shows only processing operations performed in a case where out of the command group included in the received driver job, principal commands are read out, but description of processing operations performed in a case where the other commands included in the received driver job are read out is omitted.

First, in a step S2402, a new command is read out from the received driver job.

Next, in a step S2403, if the command read out in the step 2402 is the print data transfer command (YES to the step S2403), the print data included in this command is sequentially printed. More specifically, the following processing operations are executed: In a step S2404, the CPU 311 checks sheet matching (operation of a determination unit). To do this, the CPU 311 may check whether or not the sheet size and the sheet type, designated in the print parameter setting command which has already been read out from the driver job, match the sheet size and the sheet type of a data set indicated by a selected one of the sheet settings selection values 5001 (hereinafter referred to as "the set sheet settings selection value 5001"). If there is a mismatch in at least one of the sheet size and the sheet type (NO to the step S2404), the CPU 311 (state shifting unit) shifts the printer 300 to an error state, and then proceeds to a step S2405, wherein the CPU 311 performs a sheet mismatch error-handling process. In the sheet mismatch error-handling process, the error is notified by using the error lamp 342 (notification unit) or the like, and confirmation is performed on whether to resolve the mismatch e.g., by a sheet selection operation or to print the data by setting the print job parameters while ignoring the mismatch. Further, the error notification may be transmitted to the client terminal 401 or the smartphone 500, which is connected to the printer 300. In this case, the client terminal 401 or the smartphone 500 having received the error notification may display information related to the error notification, such as details of the error and an error release method, on the screen. Note that in the present embodiment, details of the processing operations in the sheet mismatch error-handling process is are differentiated based on whether the sheet size and the sheet type set for the received job correspond to one of the sheet selection lamps 333 to 335 or the sheet selection lamp 336. If the sheet settings match each other (YES to the step S2404), or if the error state is released by executing the sheet mismatch error-handling process in the step S2405, the process proceeds to a step S2406, wherein the CPU 311 executes a print operation according to the bit image of the page image received by the print data transfer command.

On the other hand, if the command read out in the step S2402 is the print parameter setting command (NO to the step S2403 and YES to a step S2408), the process proceeds to a step S2409. In the step S2409, the CPU 311 holds the parameters of the sheet size, the sheet type, and the print quality, designated in the command data, in the work area as the parameters for use in the print job. On the other hand, if the command read out in the step S2402 is not the print parameter setting command (NO to the step S2408), the process proceeds to a step S2410.

If it is determined in the step S2410 that the command read out in the step S2402 is the registered sheet setting command (operation of a detection unit) (YES to the step S2410), the process proceeds to a step S2411. On the other hand, if the command read out in the step S2402 is not the registered sheet setting command (NO to the step S2410), the process proceeds to a step S2412.

In the step S2411, the sheet size and the sheet type designated in the command data are stored in the sheet information data set 5005 of the sheet information settings 5000 (operation of a registration unit).

If it is determined in the step S2412 that the command read out in the step S2402 is the job end command (YES to the step S2412), the process leaves the repeat loop and is terminated. On the other hand, if the command read out in the step S2402 is not the job end command (NO to the step S2412), the process proceeds to the step S2407 and returns to the step S2402 of the repeat loop.

Figure 16:
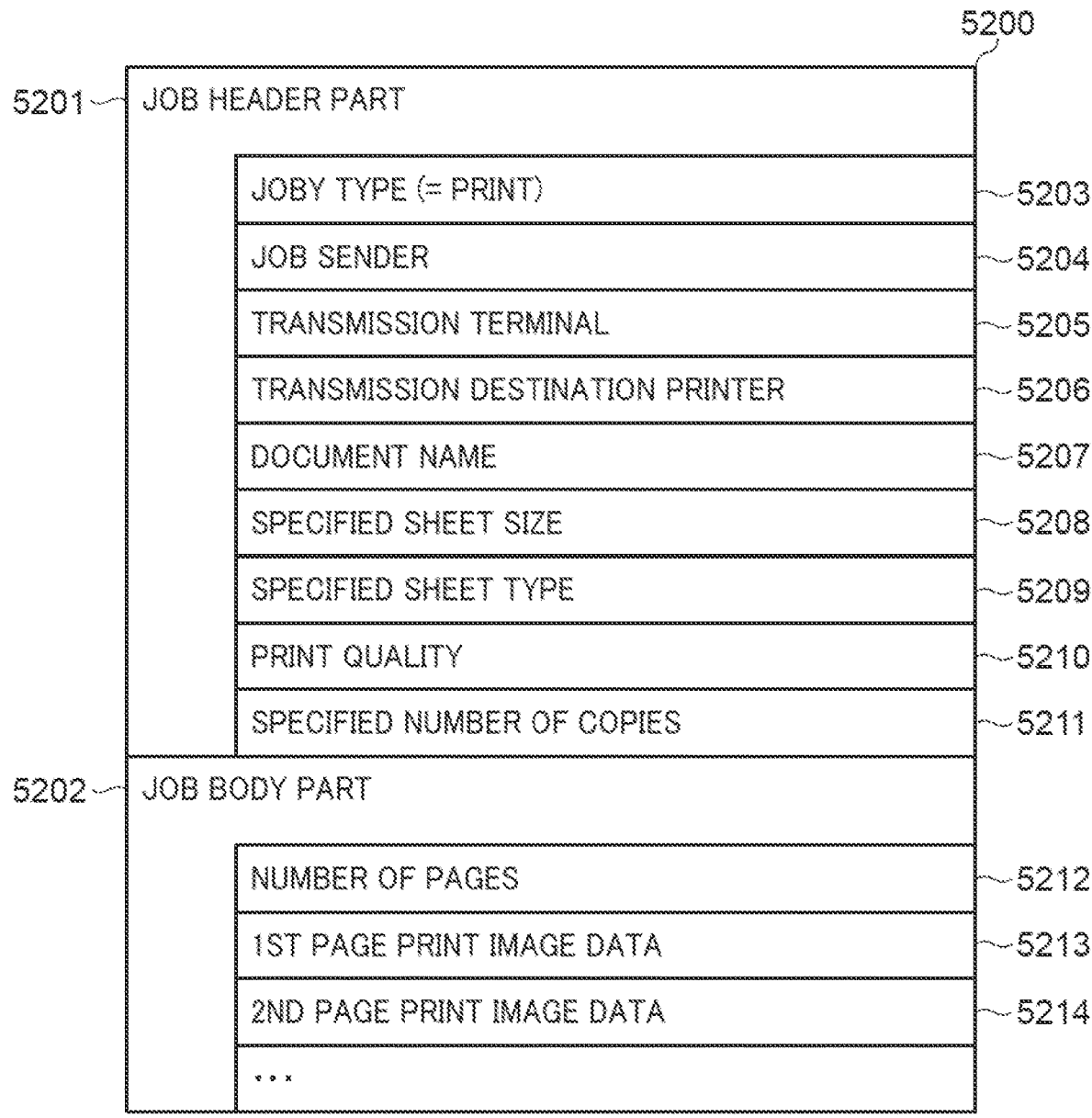
FIG. 16 is a diagram showing a data structure of a standard print job generated by a standard print service of the smartphone.

FIG. 16 is a diagram showing a standard print job 5200 which is an example of a standard job generated by the standard print service 1522 of the smartphone 500. Although in FIG. 16, the standard print job 5200 whose job type is a print job will be described as an example of the standard job, the standard job may be of another job type, such as a scan job.

In the printer 300, if reception of a standard job from the smartphone 500 is detected in the step S2014, the received standard job is analyzed by the standard print application 1343, and processing according to the analyzed contents of the job is executed.

The standard print job 5200 is formed by a job header part 5201 and a job body part 5202. The job header part 5201 is used to pass the parameters required to execute the standard print job 5200.

The job header part 5201 stores a job type 5203, a job sender 5204, a transmitting terminal 5205, a transmission destination printer 5206, a document name 5207, a specified sheet size 5208, a specified sheet type 5209, print quality 5210, and a specified number of copies 5211.

The job type 5203 stores the data of "print" indicating a print job which is a job type of the standard print job 5200. Not that examples of the job type stored as the specification of the job type 5203 in the standard job include a print job and a scan job. The job sender 5204 stores a character string indicating a sender of the standard print job 5200. The transmitting terminal 5205 stores a character string indicating a terminal which transmits the standard print job 5200. The transmission destination printer 5206 stores a character string indicating the printer 300 that receives the standard print job 5200. The document name 5207 stores a character string representing a document name of print data included in the standard print job 5200. The specified sheet size 5208 stores a character string specifying a sheet size used in the standard print job 5200. The character string specified here is different from the ID for identifying the sheet size in the printer 300, and hence the printer 300 is required to perform conversion between the specified sheet size 5208 and the ID. The specified sheet type 5209 stores a character string specifying a sheet type used in the standard print job 5200. The character string specified here is different from the ID for identifying the sheet type in the printer 300, and hence the printer 300 is required to perform conversion between the specified sheet type 5209 and the ID. The print quality 5210 stores print quality required when the standard print job 5200 is executed. The specified number of copies 5211 stores the number-of-copies information used when the standard print job 5200 is executed.

The job body part 5202 is used to pass the print data included in the standard print job 5200 to the printer 300. Although FIG. 16 shows the contents of the job body part 5202 in a case where the job type 5203 is the print job, there is a case where the standard job is of another job type, a case where the job body part 5202 stores different contents, and a case where the job body part 5202 is not included.

The job body part 5202 stores a number of pages 5212, first page print image data 5213, second page print image data 5214, and so forth. Note that although FIG. 16 shows a case where the number of pages of the standard print job 5200 is two, by way of example, print image data is stored in the job body part 5202 for each page of the standard print job 5200.

The number of pages 5212 designates the number of image data items stored in the job body part 5202, i.e., the number of pages of the standard print job 5200. The first page print image data 5213 stores print image data of the first page included in the standard print job 5200, and the second page print image data 5214 stores print image data of the second page included in the standard print job 5200. As the format of the print image data stored in the job body part 5202, an image format which is generally used, such as TIFF and JPEG, or an image format having less image deterioration caused by compression, such as TIFF and PNG, can be used.

Figure 17:
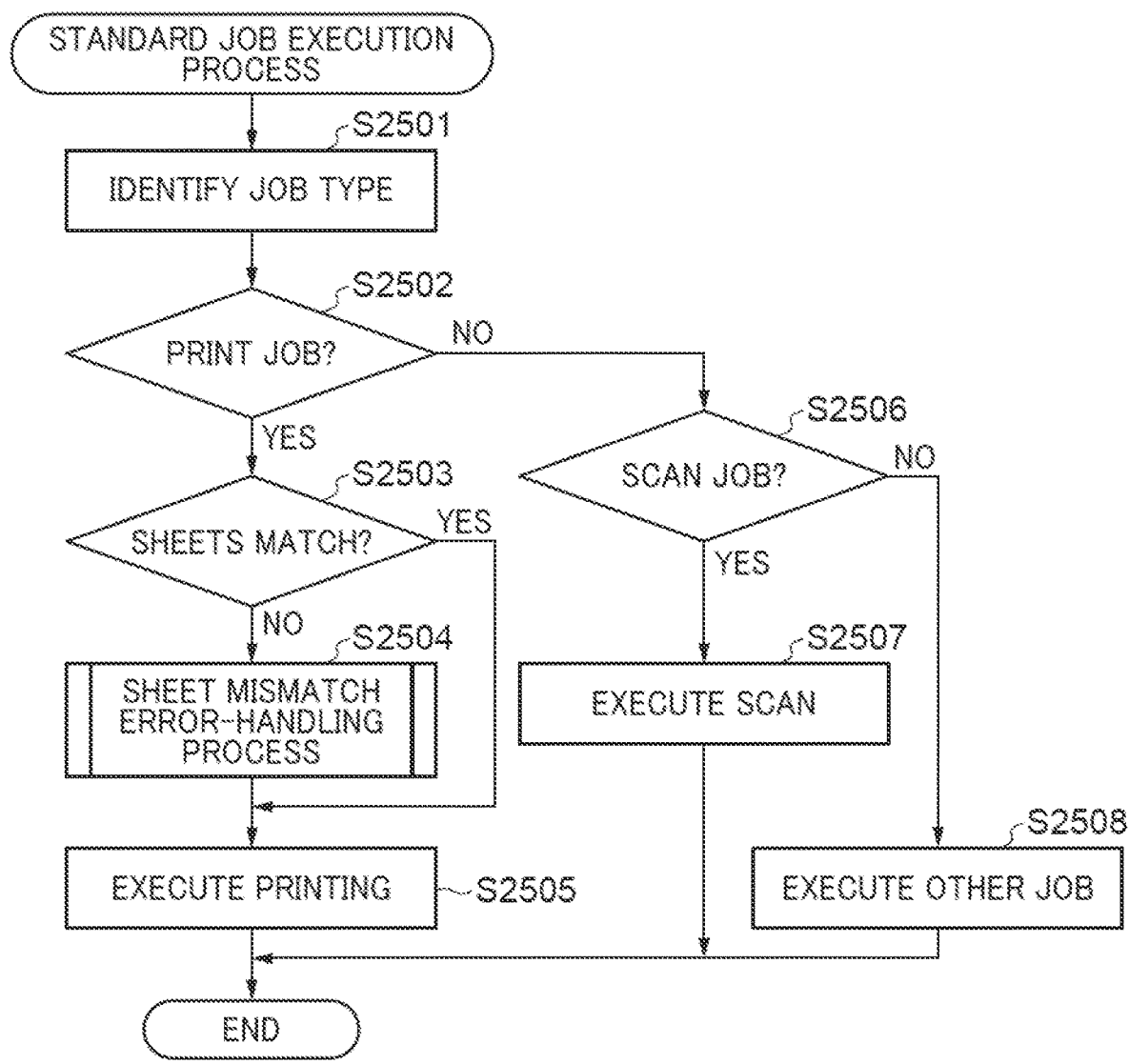
FIG. 17 is a flowchart of a standard job execution process in a step in FIG. 10.

FIG. 17 is a flowchart of the standard job execution process in the step S2015 in FIG. 10.

First, in a step S2501, the CPU 311 identifies the job type of a standard job received from the smartphone 500 and executes processing operations according to the identified job type. For example, in a case where the received standard job is the standard print job 5200 shown in FIG. 16 by way of example, "print" is stored in the job type 5203, and hence the job type is identified as a print job.

In a step S2502, if the job type identified in the step S2501 is the print job, the print data included in the received standard job is sequentially printed. More specifically, assuming that the received standard job is the standard print job 5200 (see FIG. 16) (YES to the step S2502), the following processing operations are performed: In a step S2503, the CPU 311 checks sheet matching (operation of the determination unit). In this determination, the CPU 311 may check whether or not the sheet size and the sheet type, specified in the specified sheet size 5208 and the specified sheet type 5209 of the standard print job 5200, match the sheet size and the sheet type of the data set associated with the set sheet settings selection value 5001. If there is a mismatch (NO to the step S2503), the CPU 311 (state shifting unit) shifts the printer 300 to the error state, and then proceeds to a step S2504 to perform the sheet mismatch error-handling process. In the sheet mismatch error-handling process, the CPU 311 notifies the user of the error using the error lamp 342 (notification unit) or the like, and confirmation is performed on whether to resolve the mismatch e.g., by a sheet selection operation or to print the data by setting the print job parameters while ignoring the mismatch. Further, the error notification may be transmitted to the client terminal 401 or the smartphone 500, which is connected to the printer 300. In this case, the client terminal 401 or the smartphone 500 having received the error notification may display information related to the error notification, such as details of the error and an error release method, on the screen. If there is no mismatch (YES to the step S2503), or if the error state is released by the sheet mismatch error-handling process in the step S2504, the process proceeds to a step S2505. In the step S2505, the CPU 311 acquires the first page print image data 5213 and the second page print image data 5214, stored in the print job, and sequentially executes the print operation, followed by terminating the present process.

On the other hand, if the job type identified in the step S2501 is a scan job (NO to the step S2502 and YES to a step S2506), the process proceeds to a step S2507, wherein the scan operation is executed, followed by terminating the present process. Note that the detailed description of the scan operation in this step is omitted. On the other hand, if the job type identified in the step S2501 is not a scan job (NO to the step S2506), the process proceeds to a step S2508.

In the step S2508, the CPU 311 executes processing according to the job type identified in the step S2501, followed by terminating the present process. Note that the detailed description of the processing in this step is omitted.

According to the present embodiment, the user can change the sheet information data set 5005 (see FIG. 9) included in the sheet information settings 5000 of the printer 300 from the sheet information-setting screen 600 (see FIG. 4A) of the remote user interface. Further, with this change, the user can select not only the sheet settings already specified on the operation panel 305 of the printer 300, but also the sheet settings corresponding to the sheet information data set 5005. With this, even in a case where the display capability of the operation panel 305 of the printer 300 is limited, it is possible to use desired sheet settings.

Note that in the present embodiment, the sheet information data set 5005 is set using the sheet information-setting screen 600 (see FIGS. 4A to 4C) of the remote user interface, by way of example. However, besides this, it is also possible to set the sheet information data set 5005 by receiving the registered sheet setting command (see FIG. 14) included in the driver job from an external terminal apparatus, such as the smartphone 500 or the client terminal 401. For example, this can be realized by providing the same setting screen as the sheet information-setting screen 600, shown in FIG. 4A, on the GUI (setting screen) of the custom print driver 1533 (see FIG. 8: printer driver) of the smartphone 500. Further, this can be realized by separately installing a sheet settings registration application for the smartphone 500 for setting the sheet information data set 5005 and providing the same setting screen as the sheet information-setting screen 600, shown in FIG. 4A, on the GUI.

Next, a second embodiment of the present invention will be described. In the sheet mismatch error-handling process in the first embodiment, the type of the sheet mismatch error to be notified is one type. In contrast, in the sheet mismatch error-handling process in the present embodiment, two types of the sheet mismatch error are notified. With this, the present embodiment enables the user to more easily grasp the cause of the sheet mismatch error than in the first embodiment, and compared with the case of the first embodiment, the user can more easily release the error state.

The sheet mismatch error-handling process in the present embodiment will be described below with reference to FIG. 18.

Figure 18:
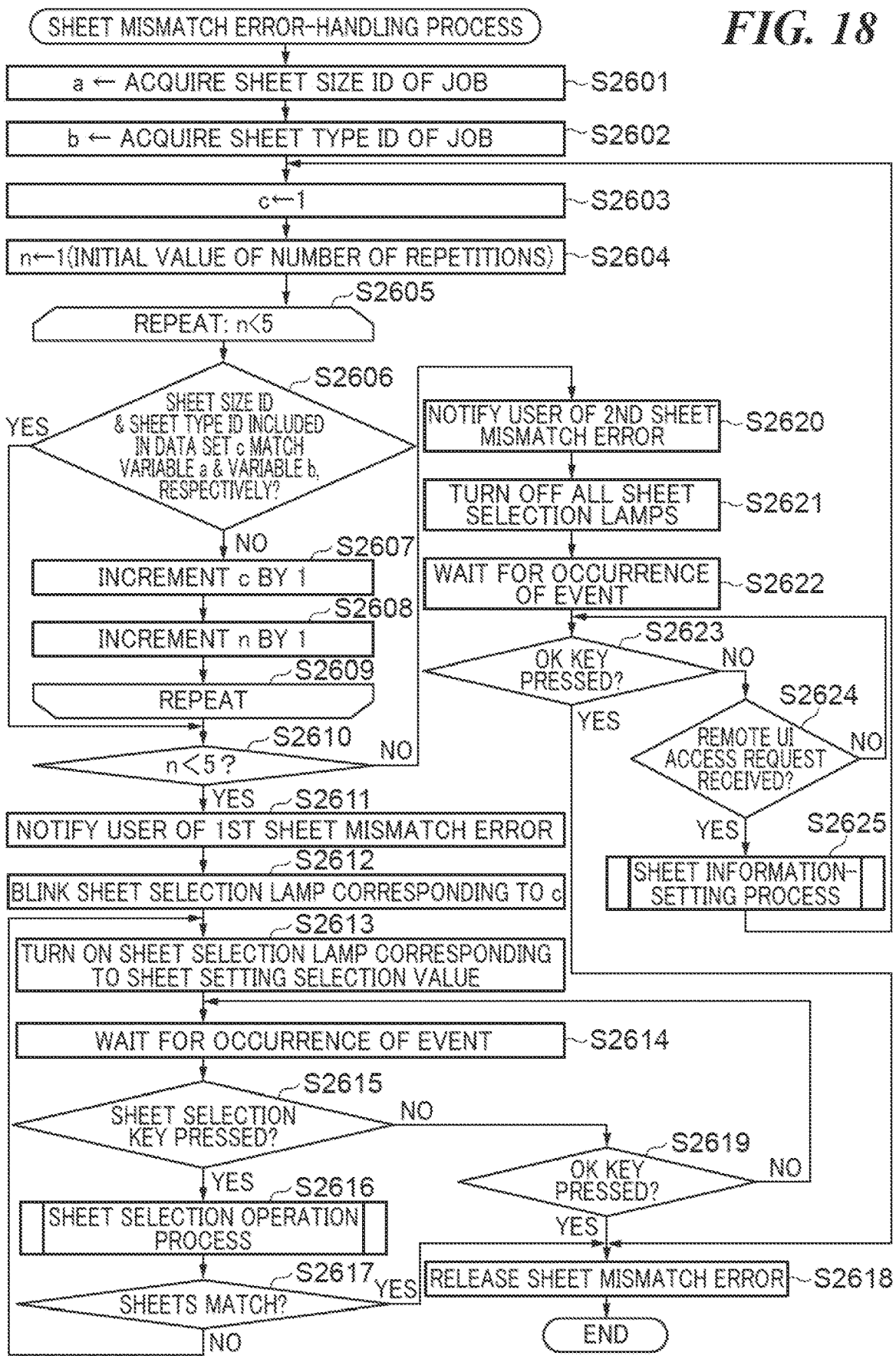
FIG. 18 is a flowchart of a sheet mismatch error-handling process in a step in FIG. 15 and a step in FIG. 17, according to a second embodiment of the present invention.

FIG. 18 is a flowchart of the sheet mismatch error-handling process in the step S2405 in FIG. 15 and the step S2504 in FIG. 17 in the present embodiment.

First, in a step S2601, the CPU 311 stores the sheet size ID of the job in a variable "a" in the work area. More specifically, when the driver job execution process (see FIG. 15) is being executed, the sheet size ID included in the print parameter setting command of the driver job is stored in the variable "a". On the other hand, when the standard job execution process (see FIG. 17) is being executed, the specified sheet size included in the job header part of the standard job is converted to the corresponding sheet size ID and stored in the variable "a".

In the next step S2602, the CPU 311 stores the sheet type ID of the job in a variable "b" in the work area. Details of this processing is the same as the procedure for acquiring the sheet size ID in the step S2601, and hence detailed description thereof is omitted.

In the next step S2603, a value of 1 is stored in a variable "c" as its initial value in the work area holding one of the IDs of the sheet information data sets 5002 to 5005. That is, the initial value of the variable "c" indicates the sheet information data set 5002 in the above-described sheet information settings 5000 shown in FIG. 9.

In the next step S2604, as the initial value of the number of repetitions, a value of 1 is stored in a variable "n" in the work area.

Then, repeated processing of steps S2605 to S2609 is executed. In this repeated processing, first, in a step S2606, the sheet size ID and the sheet type ID, included in the sheet information data set indicated by the variable "c", are acquired. Then, the CPU 311 checks whether or not the acquired sheet size ID and the variable "a" match each other and whether or not the acquired sheet type ID and the variable "b" match each other. If the checks both indicate a match between the acquired ID and the variable, the process leaves the repeated processing and the process proceeds to a step S2610, whereas if at least one of the checks indicates a mismatch, the process proceeds to a step S2607, wherein the CPU 311 increments the variable "c" indicating the sheet information data set by 1. Then, in a step S2608, the CPU 311 increments the variable "n" indicating the number of repetitions by 1. Then, in a step S2609, if the variable "n" indicating the number of repetitions is equal to or larger than 5, the process leaves the repeated processing, and proceeds to the step S2610, whereas if the variable "n" is smaller than 5, the process returns to the step S2605 to continue the repeated processing.

In the step S2610, the CPU 311 checks whether or not the variable "n" indicating the number of repetitions is smaller than 5. Note that this determination corresponds to the determination of whether or not the sheet settings (the sheet size and the sheet type) designated in the job is included in the plurality of sheet settings sets which can be currently set by an operation performed on the main unit of the printer 300 (operation performed on the sheet selection key 337). This is because in a case where a sheet settings set designated in the job is not included in the plurality of sheet settings sets which can be currently set by an operation performed on the main unit of the printer 300, the variable "n" becomes equal to or larger than 5. That is, a case where the answer to this determination becomes negative (NO) is a case where the sheet settings set designated in the job can be set on the remote user interface as the sheet settings set corresponding to the sheet selection lamp 336 but is not currently set as the sheet settings set associated with the sheet selection lamp 336. If the variable "n" is smaller than 5 (YES to the step S2610), the printer 300 is shifted to the error state, and then the process proceeds to a step S2611. In the step S2611, the CPU 311 notifies the user of a first sheet mismatch error (first notification), whereby release of the error is awaited by prompting the user to operate the sheet selection key 337 included in the operation panel 305. More specifically, the CPU 311 notifies the user that the first sheet mismatch error has occurred by blinking the error lamp 342 included in the operation panel 305. The first sheet mismatch error is an error caused by a reason that the sheet settings set designated in the job has not been currently set for the printer 300 by the sheet selection key 337 but can be set by operating the sheet selection key 337. Further, the CPU 311 notifies the client terminal 401 or the smartphone 500, which is connected to the printer 300, that the first sheet mismatch error has occurred. Note that the client terminal 401 or the smartphone 500 having received this notification may display information based on the received notification on a notification screen for notifying the user of the contents to be notified to the user, including information that the first sheet mismatch error has occurred, details of the error, and a method of releasing the error. FIG. 19A shows an example of the notification screen displayed at this time. For example, the screen displayed based on the notification that the first sheet mismatch error has occurred includes an area for notifying the user that the print settings concerning the sheet designated by the job and the sheet settings currently set for the printer 300 do not match. Note that the notification screen may be a screen that displays a link button for displaying the above-described contents to be notified to the user using the Web browser. In the illustrated example in FIG. 19A, when a link button 19A1 of "instruction manual" is pressed, a Web page indicating the method of releasing the error is displayed by the Web browser. Further, when a "print stop" button 19A2 is pressed, an instruction for canceling the job is transmitted from the client terminal 401 or the smartphone 500, which has received pressing of this button, to the printer 300. When the printer 300 receives the job cancellation instruction, even when the sheet mismatch error-handling process in FIG. 18 is being executed, cancellation of the job may be executed, and the sheet mismatch error-handling process in FIG. 18 may be terminated. In the next step S2612, the CPU 311 starts the lamp blinking operation for blinking one of the sheet selection lamps 333 to 336, which corresponds to the sheet information data set indicated by the variable "c". The variable "c" at this time is a value compared with and determined to match the variable "a" indicating sheet size ID of the job, in the step S2606, and as a result, the lamp corresponding to the sheet information data set indicated by the variable "c" is a lamp corresponding to the sheet settings designated by the job. Note that this lamp blinking operation is executed as another process operating on the real-time OS and executed in parallel with the present process. Note that the blinking pattern of the lamp in the lamp blinking processing may be the same as or different from the blinking pattern of the lamp in the lamp blinking operation started in the step S2202 in FIG. 12.

In the next step S2613, the CPU 311 turns on one of the sheet selection lamps 333 to 336, which corresponds to the set sheet settings selection value 5001 of the sheet information settings 5000. The lamp corresponding to the set sheet settings selection value 5001 of the sheet information settings 5000 is the lamp corresponding to the sheet settings currently set for the printer 300. In the next step S2614, the CPU 311 waits for occurrence of an event, and when a predetermined event occurs, the process proceeds to a step S2615. The predetermined event whose occurrence is monitored for in this step is a key operation performed by the user on the operation panel 305.

If it is detected in the step S2615 that the occurred event is the operation of pressing the sheet selection key 337 (YES to the step S2615), the process proceeds to a step S2616, wherein the sheet selection operation process described with reference to FIG. 12 is executed. At this time, although the lamp turned on in the step S2613 is turned off, two lamps out of the sheet selection lamps 333 to 336 are in a blinking state as a result of execution of the step S2612 and the step S2202 in FIG. 12. The user presses the sheet selection key 337 while confirming the state of the sheet selection lamps 333 to 336, and when the number of blinking lamps is reduced to one, the user presses the OK key 338 to determine the sheet settings selection value 5001. With this, it is possible to cause the sheet settings of the sheet information data set having the ID set to the sheet settings selection value 5001 to match the sheet settings of the job. When the sheet selection operation process is terminated, the process proceeds to a step S2617, wherein the CPU 311 checks sheet matching. In this check, the CPU 311 is only required to check whether or not the sheet size ID and the sheet type ID, which are stored as the variable "a" and the variable "b", respectively, match the sheet size ID and the sheet type ID of the sheet information data set having the ID set to the sheet settings selection value 5001. If it is determined as a result of the check that a sheet mismatch has occurred (NO to the step S2617), the process returns to the step S2613, whereas if a sheet match has occurred (YES to the step S2617), the process proceeds to a step S2618, wherein the sheet mismatch error is released, followed by terminating the present process. In this step, the sheet mismatch error is released by turning off the error lamp 342 included in the operation panel 305. Further, the one of the sheet selection lamps 333 to 336, which corresponds to the sheet settings selection value 5001 of the sheet information settings 5000, is turned on, and the other lamps are turned off.

On the other hand, if it is detected that the occurred event is the operation of pressing the OK key 338 (NO to the step S2615 and YES to a step S2619), the process proceeds to the step S2618, wherein the sheet mismatch error is released, followed by terminating the present process. In this case, the print job parameters are set by ignoring the mismatch.

Note that if it is detected that the occurred event is neither the operation of pressing the sheet selection key 337 nor the operation of pressing the OK key 338 (NO to the step S2615 and NO to the step S2619), the process returns to the step S2614.

If it is determined in the step S2610 that the variable "n" is equal to or larger than 5 (NO to the step S2610), the process proceeds to a step S2620, wherein the CPU 311 notifies the user of a second sheet mismatch error (second notification) and prompts the user to perform the sheet information setting on the remote user interface to release the error without prompting the user to perform the sheet selection operation. The second sheet mismatch error is an error caused by a reason that the sheet settings designated in the job is not currently set for the printer 300 by the sheet selection key 337 and at the same time is not included in the plurality of sheet settings which can be set by operating the sheet selection key 337. The plurality of sheet settings which can be set by operating the sheet selection key 337 are the sheet settings which are currently associated with the sheet selection lamps 333 to 336. More specifically, the following operation is performed: In the step S2620, occurrence of the second sheet mismatch error is notified by blinking the error lamp 342 included in the operation panel 305. Note that the error lamp 342 may be blinked according to a blinking pattern different from the blinking pattern of the error lamp 342 in the step S2611.

Further, the CPU 311 notifies the client terminal 401 or the smartphone 500, which is connected to the printer 300, that the second sheet mismatch error has occurred. Note that the client terminal 401 or the smartphone 500 having received this notification may display information based on the received notification on a notification screen for notifying contents to be notified to the user, including information that the second sheet mismatch error has occurred, details of the error, and a method of releasing the error. FIG. 19B shows an example of the notification screen displayed at this time. In the present embodiment, the screen displayed based on the notification notifying the user of occurrence of the first sheet mismatch error and the screen displayed based on the notification notifying the user of occurrence of the second sheet mismatch error are differentiated. For example, the screen displayed based on the notification that the second sheet mismatch error has occurred includes an area for notifying the user that the print settings concerning the sheet designated by the job is not included in the plurality of sheet settings which can be currently set by performing an operation on the body of the printer 300.

Further, for example, the screen includes an area for prompting the user to cancel the job by pressing the stop key 341. Further, for example, the screen includes an area for notifying the user that the settings concerning the sheet, set for the printer 300, can be changed on the remote user interface. Note that the notification screen may be a screen that displays a link button for displaying the above-described contents to be notified to the user using the Web browser. In the illustrated example in FIG. 19B, when a link button 19B1 of "instruction manual" is pressed, a Web page indicating the method of releasing the error is displayed by the Web browser. Further, when a "print stop" button 19B2 is pressed, an instruction for canceling the job is transmitted from the client terminal 401 or the smartphone 500, which has received pressing of this button, to the printer 300. When the printer 300 receives the job cancellation instruction, even when the process in FIG. 18 is being executed, cancellation of the job may be executed, and the process in FIG. 18 may be terminated.

Further, in a case where the second sheet mismatch error has occurred, the printer 300 may perform control to invalidate an operation from the sheet selection key 337 to thereby inhibit the current sheet settings of the printer 300 from being changed by operating the sheet selection key 337. This is because the second sheet mismatch error is not solved by changing the current sheet settings of the printer 300 by operating the sheet selection key 337.

In the next step S2621, the CPU 311 turns off all of the sheet selection lamps 333 to 336 to indicate the sheet size ID and the sheet type ID, stored in the variable "a" and the variable "b", respectively, do not match any of the sheet information data sets included in the sheet information settings 5000. Note that in the step S2621, not all of the sheet selection lamps 333 to 336 are turned off, but the same processing as the step S2613 may be executed.

In the next step S2622, the CPU 311 waits for occurrence of an event, and when a predetermined event occurs, the process proceeds to a step S2623. The predetermined event whose occurrence is monitored for in this step is one of a key operation performed by the user on the operation panel 305 and a remote user interface access request from the smartphone 500.

If it is detected in the step S2623 that the occurred event is the operation of pressing the OK key 338 (YES to the step S2623), the process proceeds to the step S2618, wherein the sheet mismatch error is released, followed by terminating the present process.

On the other hand, if it is detected that the occurred event is not the operation of pressing the OK key 338 (NO to the step S2623), the process proceeds to a step S2624. Then, in the step S2624, it is determined whether or not the occurred event is a remote user interface access request from the smartphone 500. If it is detected that the occurred event is a remote user interface access request from the smartphone 500 (NO to the step S2623 and YES to the step S2624), the process proceeds to a step S2625. In the step S2625, the sheet information-setting process from the remote user interface, described with reference to FIG. 13, is executed to once release the sheet mismatch error. With this sheet information-setting process, the registered sheet information is updated, whereby it is possible to cause the sheet size ID and the sheet type ID, stored in the variable "a" and the variable "b", respectively, to match the sheet information data set 5005 included in the sheet information settings 5000. When the sheet information-setting process is terminated, the step S2603 et seq, are executed. Wit this, the CPU 311 checks whether or not the sheet size ID and the sheet type ID, stored in the variable "a" and the variable "b", respectively, and the sheet seize ID and the sheet type ID included in one of the four sheet information data sets 5002 to 5005 included in the sheet information settings 5000 match.

Note that in a case where a user operation of pressing the stop key 341 is received when the CPU 311 waits for occurrence of an event in the step S2614 and the S2622, cancellation of the job may be executed, and the present process may be terminated. However, in a case where the present process (in the step S2405) is terminated by executing cancellation of the job during the driver job execution process (see FIG. 15), a step for determining whether or not cancellation of the job has been executed is provided immediately after the step S2405. If it is determined in this step that cancellation of the job has been executed, the CPU 311 is only required to perform control not to execute the step S2406. Similarly, in a case where the present process (in the step S2504) is terminated by executing cancellation of the job during the standard job execution process (see FIG. 17), a step for determining whether or not cancellation of the job has been executed is provided immediately after the step S2504. If it is determined in this step that cancellation of the job has been executed, the CPU 311 is only required to perform control not to execute the step S2505. Further, although in the above description, the sheet mismatch error is resolved by executing the sheet information-setting process from the remote user interface before receiving cancellation of the job, this is not limitative. Execution of the sheet information-setting process from the remote user interface may be controlled not to be executed unless cancellation of the job is received. That is, unless cancellation of the job is received, even when a remote user interface access request is received from the smartphone 500, the CPU 311 may perform control to ignore this request and perform control to prevent the sheet information-setting process from being executed from the remote user interface.

Note that when the sheet mismatch error-handling process in FIG. 18 is terminated in the step S2405 of the driver job execution process in FIG. 15, printing is executed in the step S2406. Incidentally, if the answer to the question of the step S2615 is negative (NO) and the answer to the question of the step S2619 is affirmative (YES) at the same time, the error is released in the step S2618, but in actuality, the sheet settings in the job and the sheet settings currently set for the printer 300 remain unmatched. In this case, in the printing executed in the step S2406, it is assumed that an image of a size based on the sheet settings of the job is printed on a sheet based on the sheet settings currently set for the printer 300. However, this is not limitative. If the answer to the question of the step S2615 is negative (NO) and the answer to the question of the step S2619 is affirmative (YES) at the same time, it may be further determined whether or not the size of the sheet based on the sheet settings currently set for the printer 300 is larger than the size based on the sheet settings of the job. Then, if the answer to this question is affirmative (YES), the process may proceed to the step S2618, whereas if the answer to this question is negative (NO), the error may be notified without executing printing based on the job while terminating the sheet mismatch error-handling process in FIG. 18, and also the CPU 311 may wait for a change of the sheet settings currently set for the printer 300. Then, when the current sheet settings of the printer 300 are changed, the process may return to the step S2503. With this, it is possible to prevent an image from being printed such that the image extends off a sheet based on the sheet settings currently set for the printer 300.

As described above, in the present embodiment, in a case where a sheet mismatch error has occurred, whether the sheet mismatch error having occurred is the first sheet mismatch error or the second sheet mismatch error is determined. Note that this determination corresponds to the steps S2605 to S2610. Then, in the present embodiment, different processing is executed according to whether the sheet mismatch error having occurred is the first sheet mismatch error or the second sheet mismatch error. In other words, processing executed based on occurrence of the first sheet mismatch error and processing executed based on occurrence of the second sheet mismatch error are controlled to be differentiated. More specifically, in the present embodiment, the processing executed to resolve (release) the sheet mismatch error having occurred is different according to whether the sheet mismatch error having occurred is the first sheet mismatch error or the second sheet mismatch error. The processing executed to resolve the first sheet mismatch error having occurred corresponds to the steps S2614 to S2617 and S2619, and the processing executed to resolve the second sheet mismatch error having occurred corresponds to the steps S2622 to S2625. Further, the contents of the notification processing for notifying the user of occurrence of the sheet mismatch error is different according to whether the sheet mismatch error having occurred is the first sheet mismatch error or the second sheet mismatch error. The notification processing associated with the first sheet mismatch error corresponds to the steps 2611 to S2613, and the notification processing associated with the second sheet mismatch error corresponds to the steps 2620 and S2621.

With the above-described control, in the printer 300 that enables a user to use desired sheet settings, whether to prompt the user to operate the sheet selection key 337 included in the operation panel 305 or prompt the user to set sheet information settings on the remote user interface is determined. With this, it is possible to provide the user with a different notification of the sheet mismatch error according to a result of the determination. As a result, even in a case where there is a limit in the display capability of the operation panel 305 of the printer 300, the user can execute the operation for releasing the sheet mismatch error, and it is possible to improve the operability of the printer 300.

Note that in the present embodiment, the present invention can also be realized by supplying a program that realizes one or more functions to a system or a computer of an apparatus via a network or a recording medium, and the system or a system controller of the apparatus loading and executing the program. The system controller has one or a plurality of processors or circuits and can include a network of a plurality of separate system controllers or a plurality of separate processors or circuits so as to load and execute executable commands.

The processors or circuits can include a central processing unit (CPU), a micro processing unit (MPU), a graphics processing unit (GPU), an application-specific integrated circuit (ASIC), and a field programmable gate array (FPGA). Further, the processors or circuits can include a digital signal processor (DSP), a data flow processor (DFP), or a neural processing unit (NPU).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-127255 filed Aug. 9, 2022, which is hereby incorporated by reference herein in its entirety.

What is claimed is:

1. A printing apparatus to which is applied a sheet setting selected by a user out of a plurality of sheet settings including a plurality of first sheet settings and a second sheet setting,
   wherein the first sheet settings are settings for which pieces of first sheet information on first sheets determined in advance without a user's selection and are registered in the printing apparatus,
   wherein the second sheet setting is a setting for which second sheet information on a second sheet is registered in the printing apparatus, the second sheet being selected by the user out of a plurality of sheets on a remote user interface displayed by a web browser function of an external apparatus communicable with the printing apparatus,
   wherein sheet information registered for the second sheet setting in the printing apparatus is changeable to other sheet information via the remote user interface,
   the printing apparatus comprising:
   a receiver configured to receive a print job;
   a printer configured to execute printing based on the print job; and
   a controller having a memory containing instructions and a processor for executing the instructions, and configured to
   in a case where a user operation to register the second sheet information in the printing apparatus is performed on the remote user interface, register the second sheet information in the printing apparatus for the second sheet setting,
   execute a first process before the printing based on the received print job is executed, based on occurrence of a first error that sheet information set in the received print job is different from sheet information registered in the printing apparatus for a sheet setting applied, out of the plurality of sheet settings, to the printing apparatus when the print job has been received, and also the sheet information set in the received print job is neither any of the pieces of first sheet information nor the second sheet information registered in the printing apparatus via the remote user interface, and
   execute a second process different from the first process before the printing based on the received print job is executed, based on occurrence of a second error that the sheet information set in the received print job is different from the sheet information registered in the printing apparatus for the sheet setting applied, out of the plurality of sheet settings, to the printing apparatus when the print job has been received, but the sheet information set in the received print job is any of the pieces of first sheet information or the second sheet information registered in the printing apparatus via the remote user interface,
wherein the first process includes, in a case where the sheet information set in the received print job is different from the sheet information registered for the sheet setting applied to the printing apparatus when the print job has been received and where the sheet information set in the received print job is neither any of the pieces of first sheet information nor the second sheet information registered in the printing apparatus via the remote user interface, displaying on the remote user interface, a first notification screen that prompts the user to change, on the remote user interface, the second sheet information registered in the printing apparatus via the remote user interface, and
wherein the second process includes displaying on the remote user interface a second notification screen, different from the first notification screen, that prompts the user to confirm the sheet setting applied to the printing apparatus.

2. The printing apparatus according to claim 1, wherein the printing based on the print job is executed without executing the first process and the second process based on a match between the sheet information set in the received print job and the sheet information associated with the sheet setting applied, out of the plurality of sheet settings, to the printing apparatus when the print job has been received.

3. The printing apparatus according to claim 1,
wherein the first notification screen is displayed on a display of the external apparatus when the first notification is executed on the external apparatus, and
wherein the second notification screen is displayed on the display of the external apparatus when the second notification is executed.

4. The printing apparatus according to claim 3, wherein a predetermined button for canceling execution of the received print job is included in the first notification screen and the second notification screen,
wherein in a case where the predetermined button is operated, an instruction for canceling execution of the received print job is transmitted to the printing apparatus, and
wherein in a case where the instruction is received by the printing apparatus, execution of the received print job is cancelled.

5. The printing apparatus according to claim 3, wherein the first notification screen is a screen for displaying a method of releasing the first error, and
wherein the second notification screen is a screen for displaying a method of releasing the second error.

6. The printing apparatus according to claim 3, wherein the second notification screen includes an area for a notification related to a remote setting function for selecting sheet information to be associated with the second sheet setting on the external apparatus.

7. The printing apparatus according to claim 1, further comprising:
a controller configured to receive a selection operation for selecting one of the plurality of sheet settings from a user, and
a changing controller configured to change a sheet setting applied to the printing apparatus, based on the selection operation, and
wherein the second process includes processing for performing control to prevent the sheet setting applied to the printing apparatus from being changed by the selection operation.

8. The printing apparatus according to claim 7, wherein the processing for performing control to prevent the sheet setting applied to the printing apparatus from being changed by the selection operation is processing for invalidating the selection operation.

9. The printing apparatus according to claim 7, wherein the first process includes processing for detecting the selection operation, and
wherein in a case where the selection operation is detected, the sheet setting applied to the printing apparatus is changed based on the selection operation.

10. The printing apparatus according to claim 1, further comprising:
a controller configured to receive a selection operation for selecting one of the plurality of sheet settings from a user, and
a changing controller configured to change the sheet setting applied to the printing apparatus based on the selection operation, and
wherein in a case where the second error has occurred, printing is executed based on the print job after the sheet setting applied to the printing apparatus is changed based on the selection operation.

11. The printing apparatus according to claim 10, wherein in a case where the second error has occurred, and where the sheet setting applied to the printing apparatus has been changed to the first sheet setting based on the selection operation, printing is executed based on the print job and the first sheet setting.

12. The printing apparatus according to claim 1, further comprising a second receiver configured to receive an operation of pressing a predetermined button from a user,
wherein in a case where the first error or the second error has occurred, where the predetermined button has been pressed without changing the sheet setting applied to the printing apparatus based on the selection operation, and where a size corresponding to the sheet information associated with the sheet setting applied, out of the plurality of sheet settings, to the printing apparatus when the print job has been received, is larger than a size corresponding to the sheet information set in the received print job, printing based on the print job is executed without changing the sheet setting applied, out of the plurality of sheet settings, to the printing apparatus when the print job has been received, and
wherein in a case where the first error or the second error has occurred, where the predetermined button has been pressed without changing the sheet setting applied to the printing apparatus based on the selection operation, and where a size corresponding to the sheet information associated with the sheet setting applied, out of the plurality of sheet settings, to the printing apparatus when the print job has been received is not larger than a size corresponding to the sheet information set in the received print job, control not to execute printing based on the print job is performed.

13. The printing apparatus according to claim 1, wherein the second process includes processing for detecting an access request from a remote setting function for selecting sheet information to be associated with the second sheet setting on an external apparatus communicable with the printing apparatus, wherein in a case where the access request is detected, the sheet information associated with the second sheet setting is changed based on the remote setting function, and wherein after the sheet information associated with the second sheet setting has been changed based on the remote setting function, printing is executed based on the print job and the second sheet setting.

14. The printing apparatus according to claim 1, wherein the printing apparatus includes a plurality of lamps, wherein the first process includes processing for controlling the plurality of lamps to a first state, and wherein the second process includes processing for controlling the plurality of lamps to a second state different from the first state.

15. The printing apparatus according to claim 14, wherein the first state includes at least one of a state in which a blinking lamp corresponds, out of the plurality of lamps, to a sheet setting with which is associated a sheet setting matching the sheet setting set in the received print job, a state in which a blinking lamp corresponds, out of the plurality of lamps, to the sheet setting applied to the printing apparatus, and a state in which an error lamp, out of the plurality of lamps, which is different from a plurality of lamps corresponding to the plurality of sheet settings is turned on blinks.

16. The printing apparatus according to claim 14, wherein the second state includes at least one of a state in which a plurality of lamps are turned off which correspond, out of the plurality of lamps, to the plurality of sheet settings, and a state in which an error lamp, out of the plurality of lamps, which is different from the plurality of lamps corresponding to the plurality of sheet settings is turned on or blinks.

17. The printing apparatus according to claim 14, wherein the plurality of sheet settings further include a third sheet setting, and wherein the third sheet settings is a setting associated with third sheet information determined in advance without the user's selection.

18. The printing apparatus according to claim 1, wherein the first sheet is at least one of an A4 sheet, a letter sheet, and a 4×6 sheet.

19. The printing apparatus according to claim 1, wherein the plurality of sheets include at least one of an A4 sheet, an A5 sheet, an A6 sheet, a B5 sheet, a B6 sheet, a letter sheet, a 4×6 sheet, a postcard, and an envelope.

20. The printing apparatus according to claim 1, wherein the sheet information includes at least one of a sheet size and a sheet type.

21. The printing apparatus according to claim 1, further comprising a plurality of lamps, wherein the second process includes executing the second notification by using the second notification screen that prompts, due to the difference, the user to confirm a status of a lamp out of the plurality of lamps, corresponding to the sheet setting applied to the printing apparatus.

22. The printing apparatus according to claim 1, wherein the first notification screen includes information indicating that the sheet information set in the received print job is not applicable to the printing apparatus.

23. The printing apparatus according to claim 1, wherein the first notification screen includes information that prompts the user to press a print stop button of the printing apparatus to stop the printing and restart the printing after changing a sheet setting.

24. The printing apparatus according to claim 1, wherein the pieces of first sheet information include A4 size, letter size, and 4×6 size.

25. A method of controlling a printing apparatus to which is applied a sheet setting selected by a user out of a plurality of sheet settings including a plurality of first sheet settings and a second sheet setting, wherein the first sheet settings are settings for which pieces of sheet information on first sheets determined in advance without a user's selection and are registered in the printing apparatus, wherein the second sheet setting is a setting for which sheet information on a second sheet is registered in the printing apparatus, the second sheet being selected by the user out of a plurality of sheets on a remote user interface displayed by a web browser function of an external apparatus communicable with the printing apparatus, wherein sheet information registered for the second sheet setting in the printing apparatus is changeable to other sheet information via the remote user interface, the method comprising:

receiving a print job;

in a case where a user operation to register the second sheet information in the printing apparatus is performed on the remote user interface, registering the second sheet information in the printing apparatus for the second sheet setting;

executing printing based on the print job;

executing a first process before the printing based on the received print job is executed, based on occurrence of a first error that sheet information set in the received print job is different from sheet information registered in the printing apparatus for a sheet setting applied, out of the plurality of sheet settings, to the printing apparatus when the print job has been received, and also the sheet information set in the received print job is neither any of the pieces of first sheet information nor the second sheet information registered in the printing apparatus via the remote user interface; and executing a second process different from the first process before the printing based on the received print job is executed, based on occurrence of a second error that the sheet information set in the received print job is different from the sheet information registered in the printing apparatus for the sheet setting applied, out of the plurality of sheet settings, to the printing apparatus when the print job has been received, but the sheet information set in the received print job is any of the pieces of first sheet information or the second sheet information registered in the printing apparatus via the remote user interface, in executing the first process, in a case where the sheet information set in the received print job is different from the sheet information registered for the sheet setting applied to the printing apparatus when the print job has been received and where the sheet information set in the received print job is neither any of the pieces of first sheet information nor the second sheet information registered in the printing apparatus via the remote user interface, displaying on the remote user interface a first notification screen that, prompts the user to change, on the remote user interface, the second sheet information registered in the printing apparatus via the remote user interface, and in executing the second process displaying on the remote user interface a second notification screen, different from the first notification screen, that prompts the user to confirm the sheet setting applied to the printing apparatus.

26. A non-transitory computer-readable storage medium storing a program for causing a computer to execute a method of controlling a printing apparatus to which is applied a sheet setting selected by a user out of a plurality of sheet settings including a plurality of first sheet settings and a second sheet setting,
    wherein the first sheet settings are settings for which pieces of sheet information on first sheets determined in advance without a user's selection and are registered in the printing apparatus,
    wherein the second sheet setting is a setting for which second sheet information on a second sheet is registered in the printing apparatus, the second sheet being selected by the user out of a plurality of sheets on a remote user interface displayed by a web browser function of an external apparatus communicable with the printing apparatus,
    wherein sheet information registered for the second sheet setting in the printing apparatus is changeable to other sheet information via the remote user interface,
    wherein the method comprises:
    receiving a print job;
    in a case where a user operation to register the second sheet information in the printing apparatus is performed on the remote user interface, registering the second sheet information in the printing apparatus for the second sheet setting;
    executing printing based on the print job;
    executing a first process before the printing based on the received print job is executed, based on occurrence of a first error that sheet information set in the received print job is different from sheet information registered in the printing apparatus for a sheet setting applied, out of the plurality of sheet settings, to the printing apparatus when the print job has been received, and also the sheet information set in the received print job is neither any of the pieces of first sheet information nor the second sheet information registered in the printing apparatus via the remote user interface; and
    executing a second process different from the first process before the printing based on the received print job is executed, based on occurrence of a second error that the sheet information set in the received print job is different from the sheet information registered in the printing apparatus for the sheet setting applied, out of the plurality of sheet settings, to the printing apparatus when the print job has been received, but the sheet information set in the received print job is any of the pieces of first sheet information or the second sheet information registered in the printing apparatus via the remote user interface,
    in executing the first process, in a case where the sheet information set in the received print job is different from the sheet information registered for the sheet setting applied to the printing apparatus when the print job has been received and where the sheet information set in the received print job is neither any of the pieces first sheet information nor the second sheet information registered in the printing apparatus via the remote user interface, displaying on the remote user interface a first notification screen that prompts the user to change, on the remote user interface, the second sheet information registered in the printing apparatus via the remote user interface, and
    in executing the second process displaying on the remote interface a second notification screen, different from the first notification screen, that prompts the user to confirm the sheet setting applied to the printing apparatus.

* * * * *